(12) United States Patent
Engelke et al.

(10) Patent No.: US 11,190,637 B2
(45) Date of Patent: *Nov. 30, 2021

(54) CAPTIONED TELEPHONE SERVICE

(71) Applicant: Ultratec, Inc., Madison, WI (US)

(72) Inventors: Robert M Engelke, Madison, WI (US);
Kevin R Colwell, Middleton, WI (US);
Troy D Vitek, Waunakee, WI (US)

(73) Assignee: Ultratec, Inc., Madison, WI (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/097,827

(22) Filed: Nov. 13, 2020

(65) Prior Publication Data

US 2021/0067629 A1    Mar. 4, 2021

Related U.S. Application Data

(63) Continuation of application No. 16/677,293, filed on Nov. 7, 2019, now Pat. No. 11,005,991, which is a (Continued)

(51) Int. Cl.
*H04M 3/42* (2006.01)
*H04M 11/06* (2006.01)

(52) U.S. Cl.
CPC ... *H04M 3/42391* (2013.01); *H04M 3/42382* (2013.01); *H04M 11/066* (2013.01)

(58) Field of Classification Search
USPC ...... 379/52, 88.16, 93.15, 207.13; 455/41.2; 348/14.02
See application file for complete search history.

(56) References Cited

U.S. PATENT DOCUMENTS

| 3,372,246 A | 3/1968 | Knuepfer |
| 3,507,997 A | 4/1970 | Weitbrecht |

(Continued)

FOREIGN PATENT DOCUMENTS

| DE | 2647097 A1 | 4/1978 |
| DE | 2749923 A1 | 5/1979 |

(Continued)

OTHER PUBLICATIONS

Declaration of Paul W. Ludwick, In Re: U.S. Pat. No. 6,594,346, Case IPR2013-00545, In the United States Patent and Trademark Office Before the Patent Trial and Appeal Board, May 11, 2014.

(Continued)

*Primary Examiner* — Maria El-Zoobi
(74) *Attorney, Agent, or Firm* — Quarles & Brady LLP

(57) ABSTRACT

A method of operating a captioned telephone call in which an assisted user's (AU's) captioned device is connected by a first line to a hearing user's (HU's) device and by a second line to a relay providing captioning for a conversation is disclosed. The method includes capturing an AU's voice signal via a microphone, transmitting the voice signal from the captioned device to the HU's device on the first line, obtaining a combined voice signal including both users' voice signals from the first line at the captioned device, cancelling the AU's voice signal from the combined signal to generate an independent HU voice signal, broadcasting the HU's voice signal via a speaker, transmitting the independent HU's voice signal to the relay, receiving captions at the captioned device from the relay corresponding to the HU's voice signal, and presenting the captions as text on a display screen.

50 Claims, 2 Drawing Sheets

Related U.S. Application Data continuation of application No. 14/969,507, filed on Dec. 15, 2015, now Pat. No. 10,491,746, which is a continuation of application No. 13/950,860, filed on Jul. 25, 2013, now Pat. No. 10,587,751, which is a continuation of application No. 12/686,688, filed on Jan. 13, 2010, now Pat. No. 8,515,024, which is a continuation of application No. 11/061,682, filed on Feb. 18, 2005, now Pat. No. 7,660,398.

(60) Provisional application No. 60/545,519, filed on Feb. 18, 2004.

(56) References Cited

U.S. PATENT DOCUMENTS

| | | |
|---|---|---|
| 3,515,814 A | 6/1970 | Morgan |
| 3,585,303 A | 6/1971 | Chieffo |
| 3,598,920 A | 8/1971 | Fischer |
| 3,800,089 A | 3/1974 | Reddick |
| 3,896,267 A | 7/1975 | Sachs |
| 3,959,607 A | 5/1976 | Vargo |
| 3,976,995 A | 8/1976 | Sebestyen |
| 4,012,599 A | 3/1977 | Meyer |
| 4,039,768 A | 8/1977 | O'Maley |
| 4,126,768 A | 11/1978 | Grenzow |
| 4,151,380 A | 4/1979 | Blomeyer et al. |
| 4,160,136 A | 7/1979 | McGough |
| 4,188,665 A | 2/1980 | Nagel et al. |
| 4,191,854 A | 3/1980 | Coles |
| 4,201,887 A | 5/1980 | Burns |
| 4,254,308 A | 3/1981 | Blomeyer et al. |
| D259,348 S | 5/1981 | Sakai et al. |
| 4,268,721 A | 5/1981 | Nielson et al. |
| 4,289,931 A | 9/1981 | Baker |
| 4,302,629 A | 11/1981 | Foulkes |
| 4,307,266 A | 12/1981 | Messina |
| 4,354,252 A | 10/1982 | Lamb et al. |
| 4,415,065 A | 11/1983 | Sandstedt |
| 4,426,555 A | 1/1984 | Underkoffler |
| 4,430,726 A | 2/1984 | Kasday |
| D273,110 S | 3/1984 | Genaro et al. |
| 4,451,701 A | 5/1984 | Bendig |
| 4,471,165 A | 9/1984 | DeFino et al. |
| D275,857 S | 10/1984 | Moraine |
| 4,490,579 A | 12/1984 | Godoshian |
| 4,503,288 A | 3/1985 | Kessler |
| D278,435 S | 4/1985 | Hikawa |
| 4,524,244 A | 6/1985 | Faggin et al. |
| D280,099 S | 8/1985 | Topp |
| 4,533,791 A | 8/1985 | Read et al. |
| 4,568,803 A | 2/1986 | Frola |
| 4,569,421 A | 2/1986 | Sandstedt |
| D283,421 S | 4/1986 | Brier |
| 4,625,080 A | 11/1986 | Scott |
| RE32,365 E | 3/1987 | Sebestyen |
| 4,650,927 A | 3/1987 | James |
| 4,659,876 A | 4/1987 | Sullivan et al. |
| 4,713,808 A | 12/1987 | Gaskill et al. |
| 4,754,474 A | 6/1988 | Feinson |
| D296,894 S | 7/1988 | Chen |
| 4,777,469 A | 10/1988 | Engelke |
| 4,799,254 A | 1/1989 | Dayton et al. |
| 4,815,121 A | 3/1989 | Yoshida |
| 4,817,135 A | 3/1989 | Winebaum |
| 4,839,919 A | 6/1989 | Borges et al. |
| 4,849,750 A | 7/1989 | Andros et al. |
| 4,866,778 A | 9/1989 | Baker |
| 4,868,860 A | 9/1989 | Andros et al. |
| 4,879,738 A | 11/1989 | Petro |
| 4,897,868 A | 1/1990 | Engelke |
| D306,727 S | 3/1990 | Fritzsche |
| 4,918,723 A | 4/1990 | Iggulden et al. |
| 4,926,460 A | 5/1990 | Gutman et al. |
| 4,951,043 A | 8/1990 | Minami |
| 4,959,847 A | 9/1990 | Engelke et al. |
| D312,457 S | 11/1990 | Inatomi |
| 4,995,077 A | 2/1991 | Malinowski |
| 5,025,442 A | 6/1991 | Lynk et al. |
| 5,027,406 A | 6/1991 | Roberts |
| 5,033,088 A | 7/1991 | Shipman |
| 5,051,924 A | 9/1991 | Bergeron |
| D322,785 S | 12/1991 | Wu |
| 5,081,673 A | 1/1992 | Engelke |
| 5,086,453 A | 2/1992 | Senoo et al. |
| 5,091,906 A | 2/1992 | Reed et al. |
| 5,095,307 A | 3/1992 | Shimura et al. |
| 5,099,507 A | 3/1992 | Mukai et al. |
| 5,121,421 A | 6/1992 | Alheim |
| 5,128,980 A | 7/1992 | Choi |
| 5,134,633 A | 7/1992 | Werner |
| 5,146,502 A | 9/1992 | Davis |
| 5,163,081 A | 11/1992 | Wycherley |
| 5,192,948 A | 3/1993 | Neustein |
| 5,199,077 A | 3/1993 | Wilcox |
| 5,210,689 A | 5/1993 | Baker |
| 5,214,428 A | 5/1993 | Allen |
| 5,216,702 A | 6/1993 | Ramsden |
| 5,249,220 A | 9/1993 | Moskowitz et al. |
| 5,280,516 A | 1/1994 | Jang |
| 5,289,523 A | 2/1994 | Vasile |
| 5,294,982 A | 3/1994 | Salomon |
| 5,307,399 A | 4/1994 | Dai et al. |
| 5,311,516 A | 5/1994 | Kuznicki et al. |
| 5,318,340 A | 6/1994 | Henry |
| 5,321,514 A | 6/1994 | Martinez |
| 5,325,417 A | 6/1994 | Engelke |
| 5,327,479 A | 7/1994 | Engelke |
| 5,339,358 A | 8/1994 | Danish et al. |
| 5,343,519 A | 8/1994 | Feldman |
| 5,351,288 A | 9/1994 | Engelke |
| D351,185 S | 10/1994 | Matsuda et al. |
| 5,359,651 A | 10/1994 | Draganoff |
| 5,375,160 A | 12/1994 | Guidon et al. |
| 5,377,263 A | 12/1994 | Bazemore et al. |
| 5,392,343 A | 2/1995 | Davitt et al. |
| 5,393,236 A | 2/1995 | Blackmer et al. |
| 5,396,650 A | 3/1995 | Terauchi |
| D357,253 S | 4/1995 | Wong |
| 5,410,541 A | 4/1995 | Hotto |
| 5,423,555 A | 6/1995 | Kidrin |
| 5,424,785 A | 6/1995 | Orphan |
| 5,426,706 A | 6/1995 | Wood |
| 5,432,837 A | 7/1995 | Engelke |
| 5,459,458 A | 10/1995 | Richardson et al. |
| 5,463,665 A | 10/1995 | Millios |
| D364,865 S | 12/1995 | Engelke et al. |
| 5,475,733 A | 12/1995 | Eisdorfer |
| 5,475,798 A | 12/1995 | Handlos |
| 5,477,274 A | 12/1995 | Akiyoshi et al. |
| 5,487,102 A | 1/1996 | Rothschild |
| 5,487,671 A | 1/1996 | Shpiro et al. |
| 5,497,373 A | 3/1996 | Hulen |
| 5,508,754 A | 4/1996 | Orphan |
| 5,517,548 A | 5/1996 | Engelke |
| 5,519,443 A | 5/1996 | Salomon |
| 5,519,808 A | 5/1996 | Benton, Jr. |
| 5,521,960 A | 5/1996 | Aronow |
| 5,522,089 A | 5/1996 | Kikinis et al. |
| 5,537,436 A | 7/1996 | Bottoms |
| 5,559,855 A | 9/1996 | Dowens |
| 5,559,856 A | 9/1996 | Dowens |
| 5,574,776 A | 11/1996 | Leuca |
| 5,574,784 A | 11/1996 | LaPadula |
| 5,581,593 A | 12/1996 | Engelke |
| 5,583,560 A | 12/1996 | Florin et al. |
| 5,604,786 A | 2/1997 | Engelke |
| D379,181 S | 5/1997 | Sawano et al. |
| 5,649,060 A | 7/1997 | Ellozy |
| 5,666,403 A | 9/1997 | Telibasa |
| 5,671,267 A | 9/1997 | August et al. |
| 5,680,443 A | 10/1997 | Kasday |
| 5,687,222 A | 11/1997 | McLaughlin |
| 5,701,338 A | 12/1997 | Leyen |

(56) References Cited

U.S. PATENT DOCUMENTS

| | | |
|---|---|---|
| 5,710,806 A | 1/1998 | Lee |
| 5,712,901 A | 1/1998 | Meermans |
| 5,724,405 A | 3/1998 | Engelke |
| 5,742,504 A | 4/1998 | Meyer et al. |
| 5,745,550 A | 4/1998 | Eisdorfer |
| 5,751,338 A | 5/1998 | Ludwig, Jr. |
| 5,766,015 A | 6/1998 | Shpiro |
| 5,787,148 A | 7/1998 | August |
| 5,799,273 A | 8/1998 | Mitchell |
| 5,809,112 A | 9/1998 | Ryan |
| 5,809,425 A | 9/1998 | Colwell |
| 5,815,196 A | 9/1998 | Alshawi |
| 5,826,102 A | 10/1998 | Escobar |
| 5,850,627 A | 12/1998 | Gould |
| D405,793 S | 2/1999 | Engelke et al. |
| 5,870,709 A | 2/1999 | Bernstein |
| 5,893,034 A | 4/1999 | Hikuma |
| 5,899,976 A | 5/1999 | Rozak |
| 5,905,476 A | 5/1999 | McLaughlin |
| 5,909,482 A | 6/1999 | Engelke |
| 5,915,379 A | 6/1999 | Wallace |
| 5,917,888 A | 6/1999 | Giuntoli |
| 5,926,527 A | 7/1999 | Jenkins |
| 5,940,475 A | 8/1999 | Hansen |
| 5,974,116 A | 10/1999 | Engelke |
| 5,978,014 A | 11/1999 | Martin |
| 5,978,654 A | 11/1999 | Colwell et al. |
| 5,982,853 A * | 11/1999 | Liebermann ...... H04M 1/72403 379/52 |
| 5,982,861 A | 11/1999 | Holloway |
| 5,991,291 A | 11/1999 | Asai |
| 5,991,723 A | 11/1999 | Duffin |
| 5,995,590 A | 11/1999 | Brunet |
| 6,002,749 A | 12/1999 | Hansen |
| 6,067,516 A | 5/2000 | Levay |
| 6,072,860 A | 6/2000 | Kek et al. |
| 6,075,534 A | 6/2000 | VanBuskirk |
| 6,075,841 A | 6/2000 | Engelke |
| 6,075,842 A | 6/2000 | Engelke |
| 6,100,882 A | 8/2000 | Sharman |
| 6,141,341 A | 10/2000 | Jones et al. |
| 6,141,415 A | 10/2000 | Rao |
| 6,173,259 B1 | 1/2001 | Bijl et al. |
| 6,175,819 B1 | 1/2001 | Van Alstine |
| 6,175,820 B1 | 1/2001 | Dietz |
| 6,181,736 B1 | 1/2001 | McLaughlin et al. |
| 6,181,778 B1 * | 1/2001 | Ohki ................ G09B 21/009 348/14.01 |
| 6,188,429 B1 | 2/2001 | Martin |
| 6,233,314 B1 | 5/2001 | Engelke |
| 6,243,684 B1 | 6/2001 | Stuart |
| 6,278,772 B1 | 8/2001 | Bowater |
| 6,298,326 B1 | 10/2001 | Feller |
| 6,307,921 B1 | 10/2001 | Engelke |
| 6,314,396 B1 | 11/2001 | Monkowski |
| 6,317,716 B1 | 11/2001 | Braida et al. |
| 6,324,507 B1 | 11/2001 | Lewis |
| 6,345,251 B1 | 2/2002 | Jansson |
| 6,377,925 B1 * | 4/2002 | Greene, Jr ............. G10L 21/06 379/52 |
| 6,381,472 B1 | 4/2002 | LaMedica, Jr. |
| 6,385,586 B1 | 5/2002 | Dietz |
| 6,389,114 B1 | 5/2002 | Dowens |
| 6,430,270 B1 | 8/2002 | Cannon et al. |
| 6,445,799 B1 | 9/2002 | Taenzer |
| 6,493,426 B2 | 12/2002 | Engelke |
| 6,493,447 B1 | 12/2002 | Goss et al. |
| 6,504,910 B1 | 1/2003 | Engelke |
| 6,507,735 B1 | 1/2003 | Baker |
| 6,510,206 B2 | 1/2003 | Engelke |
| 6,549,611 B2 | 4/2003 | Engelke |
| 6,549,614 B1 | 4/2003 | Zebryk et al. |
| 6,567,503 B2 | 5/2003 | Engelke |
| 6,594,346 B2 | 7/2003 | Engelke |
| 6,603,835 B2 | 8/2003 | Engelke |
| 6,625,259 B1 | 9/2003 | Hollatz |
| 6,661,879 B1 | 12/2003 | Schwartz |
| 6,668,042 B2 | 12/2003 | Michaelis |
| 6,668,044 B1 | 12/2003 | Schwartz |
| 6,701,162 B1 | 3/2004 | Everett |
| 6,748,053 B2 | 6/2004 | Engelke |
| 6,763,089 B2 | 7/2004 | Feigenbaum |
| 6,775,360 B2 | 8/2004 | Davidson |
| 6,778,824 B2 | 8/2004 | Wonak et al. |
| 6,816,468 B1 | 11/2004 | Cruickshank |
| 6,816,469 B1 | 11/2004 | Kung et al. |
| 6,816,834 B2 | 11/2004 | Jaroker |
| 6,831,974 B1 | 12/2004 | Watson et al. |
| 6,850,609 B1 | 2/2005 | Schrage |
| 6,865,258 B1 | 3/2005 | Polcyn |
| 6,876,967 B2 | 4/2005 | Goto |
| 6,885,731 B2 | 4/2005 | Engelke |
| 6,894,346 B2 | 5/2005 | Onose |
| 6,934,366 B2 | 8/2005 | Engelke |
| 6,934,376 B1 | 8/2005 | McLaughlin |
| 6,948,066 B2 | 9/2005 | Hind |
| 6,950,500 B1 | 9/2005 | Chaturvedi |
| 6,980,953 B1 | 12/2005 | Kanevsky |
| 6,987,850 B1 | 1/2006 | Watson |
| 7,003,082 B2 | 2/2006 | Engelke |
| 7,006,604 B2 | 2/2006 | Engelke |
| 7,016,479 B2 | 3/2006 | Flathers et al. |
| 7,035,383 B2 | 4/2006 | O'Neal |
| 7,042,718 B2 | 5/2006 | Aoki et al. |
| 7,088,832 B1 | 8/2006 | Cooper |
| 7,117,152 B1 | 10/2006 | Mukherji |
| 7,117,438 B2 | 10/2006 | Wallace |
| 7,142,642 B2 | 11/2006 | McClelland |
| 7,142,643 B2 | 11/2006 | Brooksby |
| 7,145,900 B2 | 12/2006 | Nix et al. |
| 7,164,753 B2 | 1/2007 | Engelke |
| 7,199,787 B2 | 4/2007 | Lee et al. |
| 7,221,405 B2 | 5/2007 | Basson |
| 7,233,655 B2 | 6/2007 | Gailey et al. |
| 7,236,580 B1 | 6/2007 | Sarkar et al. |
| 7,287,009 B1 | 10/2007 | Liebermann |
| 7,295,663 B2 | 11/2007 | McLaughlin |
| 7,313,231 B2 | 12/2007 | Reid |
| 7,315,612 B2 | 1/2008 | McClelland |
| 7,319,740 B2 | 1/2008 | Engelke |
| 7,363,006 B2 | 4/2008 | Mooney |
| 7,406,413 B2 | 7/2008 | Geppert |
| 7,430,283 B2 | 9/2008 | Steel, Jr. |
| 7,555,104 B2 | 6/2009 | Engelke |
| 7,573,985 B2 | 8/2009 | McClelland et al. |
| 7,606,718 B2 | 10/2009 | Cloran |
| 7,660,398 B2 | 2/2010 | Engelke |
| 7,747,434 B2 | 6/2010 | Flanagan et al. |
| 7,792,701 B2 | 9/2010 | Basson et al. |
| 7,848,358 B2 | 12/2010 | LaDue |
| 7,881,441 B2 | 2/2011 | Engelke et al. |
| 7,904,113 B2 | 3/2011 | Ozluturk et al. |
| 8,213,578 B2 | 7/2012 | Engleke |
| 8,259,920 B2 | 9/2012 | Abramson et al. |
| 8,369,488 B2 | 2/2013 | Sennett et al. |
| 8,379,801 B2 | 2/2013 | Romriell |
| 8,416,925 B2 | 4/2013 | Engelke et al. |
| 8,908,838 B2 | 12/2014 | Engelke et al. |
| 8,917,821 B2 | 12/2014 | Engelke et al. |
| 8,917,922 B2 | 12/2014 | Engelke et al. |
| 9,131,045 B2 | 9/2015 | Engleke et al. |
| 9,355,611 B1 | 5/2016 | Wang et al. |
| 9,961,196 B2 | 5/2018 | Engelke et al. |
| 9,967,380 B2 | 5/2018 | Engelke et al. |
| 10,469,660 B2 | 11/2019 | Engelke et al. |
| 10,491,746 B2 | 11/2019 | Engelke et al. |
| 10,587,751 B2 | 3/2020 | Engelke et al. |
| 2001/0005825 A1 | 6/2001 | Engelke et al. |
| 2002/0007275 A1 | 1/2002 | Goto et al. |
| 2002/0055351 A1 | 5/2002 | Elsey et al. |
| 2002/0085685 A1 | 7/2002 | Engelke et al. |
| 2002/0085703 A1 | 7/2002 | Proctor |
| 2002/0086685 A1 | 7/2002 | Wallentin et al. |
| 2002/0094800 A1 | 7/2002 | Trap et al. |

(56) References Cited

U.S. PATENT DOCUMENTS

| | | | |
|---|---|---|---|
| 2002/0101537 A1 | 8/2002 | Basson et al. | |
| 2002/0103008 A1 | 8/2002 | Rahn et al. | |
| 2002/0119800 A1 | 8/2002 | Jaggers et al. | |
| 2002/0122550 A1 | 9/2002 | Noplock | |
| 2002/0178001 A1 | 11/2002 | Balluff et al. | |
| 2002/0193076 A1 | 12/2002 | Rogers et al. | |
| 2003/0045329 A1 | 3/2003 | Kinoshita | |
| 2003/0063731 A1 | 4/2003 | Woodring | |
| 2003/0097262 A1 | 5/2003 | Nelson | |
| 2003/0210767 A1 | 11/2003 | Lund | |
| 2004/0066926 A1* | 4/2004 | Brockbank | H04M 3/42323 379/207.13 |
| 2004/0073432 A1 | 4/2004 | Stone | |
| 2004/0083105 A1 | 4/2004 | Jaroker | |
| 2004/0143430 A1 | 7/2004 | Said et al. | |
| 2004/0146150 A1 | 7/2004 | Barnes | |
| 2005/0025290 A1 | 2/2005 | Doherty et al. | |
| 2005/0048997 A1 | 3/2005 | Grobler et al. | |
| 2005/0063520 A1 | 3/2005 | Michaelis | |
| 2005/0094776 A1 | 5/2005 | Haldeman et al. | |
| 2005/0094777 A1 | 5/2005 | McClelland | |
| 2005/0129185 A1 | 6/2005 | McClelland et al. | |
| 2005/0144012 A1* | 6/2005 | Afrashteh | G10L 15/26 704/277 |
| 2005/0180553 A1 | 8/2005 | Moore | |
| 2005/0183109 A1 | 8/2005 | Basson et al. | |
| 2005/0225628 A1 | 10/2005 | Antoniou | |
| 2005/0226394 A1 | 10/2005 | Engelke et al. | |
| 2005/0226398 A1* | 10/2005 | Bojeun | H04L 12/2854 379/93.15 |
| 2005/0232169 A1* | 10/2005 | McLaughlin | H04Q 3/04 370/261 |
| 2005/0277431 A1 | 12/2005 | White | |
| 2006/0105712 A1* | 5/2006 | Glass | G06F 21/35 455/41.2 |
| 2006/0133583 A1 | 6/2006 | Brooksby | |
| 2006/0140354 A1 | 6/2006 | Engelke | |
| 2006/0153122 A1 | 7/2006 | Hinman et al. | |
| 2006/0172720 A1 | 8/2006 | Islam et al. | |
| 2006/0285652 A1 | 12/2006 | McClelland et al. | |
| 2006/0285662 A1* | 12/2006 | Yin | H04M 7/0045 379/88.16 |
| 2007/0024583 A1 | 2/2007 | Gettemy et al. | |
| 2007/0036282 A1 | 2/2007 | Engleke et al. | |
| 2008/0043936 A1 | 2/2008 | Liebermann | |
| 2008/0152093 A1 | 6/2008 | Engelke et al. | |
| 2008/0187108 A1 | 8/2008 | Engelke et al. | |
| 2010/0063815 A1 | 3/2010 | Cloran et al. | |
| 2011/0087491 A1 | 4/2011 | Wittenstein et al. | |
| 2011/0123003 A1 | 5/2011 | Romriell et al. | |
| 2011/0170672 A1 | 7/2011 | Engelke et al. | |
| 2012/0108196 A1 | 5/2012 | Musgrove et al. | |
| 2012/0250837 A1 | 10/2012 | Engelke et al. | |
| 2013/0017800 A1 | 1/2013 | Gouvia et al. | |
| 2013/0171958 A1 | 7/2013 | Goodson et al. | |
| 2013/0308763 A1 | 11/2013 | Engelke et al. | |
| 2013/0331056 A1 | 12/2013 | McKown et al. | |
| 2014/0099909 A1 | 4/2014 | Daly et al. | |
| 2015/0358461 A1 | 12/2015 | Klaban | |

FOREIGN PATENT DOCUMENTS

| | | |
|---|---|---|
| DE | 3410619 A1 | 10/1985 |
| DE | 3632233 A1 | 4/1988 |
| DE | 10328884 A1 | 2/2005 |
| EP | 0016281 A1 | 10/1980 |
| EP | 0029246 A1 | 5/1981 |
| EP | 0651372 A2 | 5/1995 |
| EP | 0655158 A1 | 5/1995 |
| EP | 0664636 A2 | 7/1995 |
| EP | 0683483 A2 | 11/1995 |
| EP | 1039733 A2 | 9/2000 |
| EP | 1330046 A1 | 7/2003 |
| EP | 1486949 A1 | 12/2004 |
| FR | 2403697 A1 | 4/1979 |
| FR | 2432805 A1 | 2/1980 |
| FR | 2538978 A1 | 7/1984 |
| GB | 2183880 A | 6/1987 |
| GB | 2285895 A | 7/1995 |
| GB | 2327173 A | 1/1999 |
| GB | 2335109 A | 9/1999 |
| GB | 2339363 A | 1/2000 |
| GB | 2334177 B | 12/2002 |
| JP | S5544283 A | 3/1980 |
| JP | S5755649 A | 4/1982 |
| JP | S58134568 A | 8/1983 |
| JP | S60259058 A | 12/1985 |
| JP | S63198466 A | 8/1988 |
| JP | H04248596 A | 9/1992 |
| KR | 20050004503 A | 12/2005 |
| WO | 9323947 A1 | 11/1993 |
| WO | 9405006 A1 | 3/1994 |
| WO | 9500946 A1 | 1/1995 |
| WO | 9519086 A1 | 7/1995 |
| WO | 9750222 A1 | 12/1997 |
| WO | 9839901 A1 | 9/1998 |
| WO | 9913634 A1 | 3/1999 |
| WO | 9952237 A1 | 10/1999 |
| WO | 0049601 A1 | 8/2000 |
| WO | 0078017 A1 | 12/2000 |
| WO | 0078018 A1 | 12/2000 |
| WO | 0155914 A1 | 8/2001 |
| WO | 0158165 A2 | 8/2001 |
| WO | 0180079 A2 | 10/2001 |
| WO | 02077971 A1 | 10/2002 |
| WO | 03026265 A1 | 3/2003 |
| WO | 03030018 A1 | 4/2003 |
| WO | 03071774 A1 | 8/2003 |
| WO | 2005081511 A1 | 9/2005 |

OTHER PUBLICATIONS

Declaration of Paul W. Ludwick, In Re: U.S. Pat. No. 7,555,104, Case IPR2013-00542 and IPR2013-00543, In the United States Patent and Trademark Office Before the Patent Trial and Appeal Board, May 12, 2014.

Declaration of Paul W. Ludwick, In Re: U.S. Pat. No. 7,319,740, Case IPR2013-00542 and IPR2013-00543, In the United States Patent and Trademark Office Before the Patent Trial and Appeal Board, May 12, 2014.

Declaration of Paul W. Ludwick, In Re: U.S. Pat. No. 6,233,314, Case IPR2013-00540, In the United States Patent and Trademark Office Before the Patent Trial and Appeal Board, May 30, 2014.

Declaration of Paul W. Ludwick, In Re: U.S. Pat. No. 5,909,482, Case IPR2013-00541, In the United States Patent and Trademark Office Before the Patent Trial and Appeal Board, May 30, 2014.

Declaration of Paul W. Ludwick, In Re: U.S. Pat. No. 8,213,578, Case IPR2013-00544, In the United States Patent and Trademark Office Before the Patent Trial and Appeal Board, May 30, 2014.

Declaration of Paul W. Ludwick Regarding Secondary Considerations of Non-Obviousness, In Re: U.S. Pat. No. 7,555,104, Case IPR2013-00543, In the United States Patent and Trademark Office Before the Patent Trial and Appeal Board, May 12, 2014.

Declaration of Paul W. Ludwick Regarding Secondary Considerations of Non-Obviousness, In Re: U.S. Pat. No. 7,319,740, Case IPR2013-00542, In the United States Patent and Trademark Office Before the Patent Trial and Appeal Board, May 12, 2014.

Declaration of Paul W. Ludwick Regarding Secondary Considerations of Non-Obviousness, In Re: U.S. Pat. No. 6,603,835, Case IPR2013-00545, In the United States Patent and Trademark Office Before the Patent Trial and Appeal Board, May 12, 2014.

Declaration of Paul W. Ludwick Regarding Secondary Considerations of Non-Obviousness, In Re: U.S. Pat. No. 6,594,346, Case IPR2013-00545, In the United States Patent and Trademark Office Before the Patent Trial and Appeal Board, May 12, 2014.

Declaration of Paul W. Ludwick Regarding Secondary Considerations of Non-Obviousness, In Re: U.S. Pat. No. 6,233,314, Case IPR2013-00540, In the United States Patent and Trademark Office Before the Patent Trial and Appeal Board, May 30, 2014.

(56) References Cited

OTHER PUBLICATIONS

Declaration of Paul W. Ludwick Regarding Secondary Considerations of Non-Obviousness, In Re: U.S. Pat. No. 5,909,482, Case IPR2013-00541, In the United States Patent and Trademark Office Before the Patent Trial and Appeal Board, May 30, 2014.
Declaration of Paul W. Ludwick Regarding Secondary Considerations of Non-Obviousness, In Re: U.S. Pat. No. 8,213,578, Case IPR2013-00544, In the United States Patent and Trademark Office Before the Patent Trial and Appeal Board, May 30, 2014.
Declaration of Kelby Brick, Esq., CDI, In Re: U.S. Pat. No. 7,555,104, Case IPR2013-00543, In the United States Patent and Trademark Office Before the Patent Trial and Appeal Board, Jul. 7, 2014.
Supplemental Declaration of Benedict J. Occhiogrosso, In Re: U.S. Pat. No. 7,003,082, Case IPR2013-00550, In the United States Patent and Trademark Office Before the Patent Trial and Appeal Board, Jul. 7, 2014.
Supplemental Declaration of Benedict J. Occhiogrosso, In Re: U.S. Pat. No. 7,555,104, Case IPR2013-00543, In the United States Patent and Trademark Office Before the Patent Trial and Appeal Board, Jul. 7, 2014.
Supplemental Declaration of Benedict J. Occhiogrosso, In Re: U.S. Pat. No. 6,594,346, Case IPR2013-00545, In the United States Patent and Trademark Office Before the Patent Trial and Appeal Board, Jul. 7, 2014.
Supplemental Declaration of Benedict J. Occhiogrosso, In Re: U.S. Pat. No. 6,603,835, Case IPR2013-00549, In the United States Patent and Trademark Office Before the Patent Trial and Appeal Board, Jul. 7, 2014.
Supplemental Declaration of Benedict J. Occhiogrosso, In Re: U.S. Pat. No. 7,319,740, Case IPR2013-00542, In the United States Patent and Trademark Office Before the Patent Trial and Appeal Board, Jul. 7, 2014.
Supplemental Declaration of Benedict J. Occhiogrosso, In Re: U.S. Pat. No. 6,233,314, Case IPR2013-00540, In the United States Patent and Trademark Office Before the Patent Trial and Appeal Board, Jul. 7, 2014.
Supplemental Declaration of Benedict J. Occhiogrosso, In Re: U.S. Pat. No. 5,909,482, Case IPR2013-00541, In the United States Patent and Trademark Office Before the Patent Trial and Appeal Board, Jul. 7, 2014.
Supplemental Declaration of Benedict J. Occhiogrosso, In Re: U.S. Pat. No. 8,213,578, Case IPR2013-00544, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,003,082, Case PR2013-00550, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,594,346, Case PR2013-00545, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 8,213,578, Case PR2013-00544, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,555,104, Case PR2013-00543, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 5,909,482, Case PR2013-00541, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 7,319,740, Case PR2013-00542, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,233,314, Case PR2013-00540, In the United States Patent and Trademark Office Before the Patent Trial and Appeal Board, Jul. 7, 2014.
Petitioner's Reply to Patent Owner's Response Under 37 C.F.R. 42.23, In Re: U.S. Pat. No. 6,603,835, Case PR2013-00549, In the United States Patent and Trademark Office Before the Patent Trial and Appeal Board, Jul. 7, 2014.
Decision, CaptionCall's Request for Rehearing, In Re: U.S. Pat. No. 6,603,835, Case IPR2013-00549, In the United States Patent and Trademark Office Before the Patent Trial and Appeal Board, Apr. 28, 2014.
Expert Report of Brenda Battat Regarding Secondary Considerations Related to Plaintiffs' Patents-In-Suit, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].
Expert Report of Mr. Benedict J. Occhiogrosso Regarding Invalidity of Asserted Claims of U.S. Patent Nos. 5,909,482; 6,233,314; 6,594,346; 6,603,835; 7,003,082; 7,319,740; 7,555,104; and 8,213,578, *Ultratec, Inc., et al. v. Sorenson Communications, Inc., et al.*, Civil Action No. 3:13-CV-346-BBC, May 30, 2014 [Redacted—Public Version].
Expert Report of Constance Phelps Regarding Secondary Considerations Related to Plaintiffs' Patents-In-Suit, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].
Validity Report of Paul W. Ludwick Under Rule 26(a)(2)(B) of the Federal Rules of Civil Procedure Regarding U.S. Patent Nos. 5,909,482; 6,233,314; 6,594,346; and 8,213,578, *Ultratec, Inc., et al. v. Sorenson Communications, Inc., at al.*, Civil Action No. 3:13-CV-346-BBC, United States District Court, Western District of Wisconsin, Apr. 22, 2014 [Redacted].
Validity Report of James A. Steel, Jr. Regarding U.S. Patent Nos. 6,603,835; 7,003,082; 7,319,740; and 7,555,104, in Response to Expert Report of Benedict Occhiogrosso and Non-Infringement Report Regarding U.S. Pat. No. 8,379,801, *Ultratec, Inc., et al. v. Sorenson Communications, Inc., et al.*, Civil Action No. 3:13-CV-346-BBC, United States District Court, Western District of Wisconsin, Apr. 20, 2014 [Redacted].
Brief in Support of Defendants Sorenson Communications, Inc. and CaptionCall, LLC's Motion for Partial Summary Judgment, *Ultratec, Inc., et al. v. Sorenson Communications, Inc., et al.*, Civil Action No. 3:13-CV-346-BBC, United States District Court, Western District of Wisconsin, Apr. 17, 2014 [Redacted].
[Corrected] Brief in Support of Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, Apr. 23, 2014 [Redacted].
Plaintiffs Ultratec, Inc. and Captel, Inc.'s Brief in Opposition to Defendants' Motion for Partial Summary Judgment—Willfulness, *Ultratec, Inc., et al. v. Sorenson Communications, Inc., et al.*, Civil Action No. 3:13-CV-346-BBC, United States District Court, Western District of Wisconsin, May 12, 2014.
Declaration of Benedict J. Occhiogrosso in Support of Defendants' Opposition to Plaintiffs' Motion for Partial Summary Judgment, *Ultratec, Inc., et al. v. Sorenson Communications, Inc., et al.*, Civil Action No. 3:13-CV-346-BBC, United States District Court, Western District of Wisconsin, May 12, 2014.
Response in Opposition to Plaintiffs' Motion for Partial Summary Judgment of Infringement and Validity, *Ultratec, Inc., et al. v. Sorenson Communications, Inc., et al.*, Civil Action No. 3:13-CV-346-BBC, United States District Court, Western District of Wisconsin, May 12, 2014 [Redacted—Public Version].
Declaration of Robert M. Engelke in Support of Plaintiffs' Response to Defendants' Motion for Partial Summary Judgment, *Ultratec, Inc., et al. v. Sorenson Communications, Inc., et al.*, Civil Action No. 3:13-CV-346-BBC, United States District Court, Western District of Wisconsin, May 12, 2014 [Redacted].
Defendants' Reply in Support of Their Motion for Partial Summary Judgment, *Ultratec, Inc., et al. v. Sorenson Communications, Inc.,*

(56) References Cited

OTHER PUBLICATIONS et al., Civil Action No. 3:13-CV-346-BBC, United States District Court, Western District of Wisconsin, May 22, 2014 [Redacted].
Reply Brief in Support of Plaintiffs' Motion for Partial Summary Judgment of Infringement and Validity, *Ultratec, Inc., et al.* v. *Sorenson Communications, Inc., et al.*, Civil Action No. 3:13-CV-346-BBC, United States District Court, Western District of Wisconsin, May 22, 2014 [Redacted—Public Version].
Sorenson Communications, Inc. and CaptionCall, LLC's Invalidity Contentions and Exhibits, *Ultratec, Inc., et al.* v. *Sorenson Communications, Inc., et al.*, Civil Action No. 14-CV-66-BBC, United States District Court, Western District of Wisconsin, Jul. 16, 2014.
Sorenson Communications, Inc. and CaptionCall, LLC's Invalidity Contentions and Exhibits, *Ultratec, Inc., et al.* v. *Sorenson Communications, Inc., et al.*, Civil Action No. 14-CV-66-BBC, United States District Court, Western District of Wisconsin, May 16, 2014.
Ultratec Inc. and Captel Inc., Amended Complaint for Patent Infringement and Declaratory Judgment, *Ultratec Inc.* and *CapTel Inc.* v. *Sorenson Communications Inc.* and *CaptionCall LLC*, Civil Action No. 13-346, Jul. 31, 2013, 16 pages.
Sorenson Communications Inc. and Captioncall LLC, Defendants' Amended Answer to Plaintiffs' Amended Complaint for Patent Infringement and Declaratory Judgment and Counterclaims, *Ultratec Inc.* and *CapTel Inc.* v. *Sorenson Communications Inc.* and *CaptionCall LLC*, Civil Action No. 13-346, Aug. 14, 2013, 71 pages.
Ultratec Inc. and Captel Inc., Plaintiffs' Answer to Defendants' Amended Counterclaims, *Ultratec Inc.* and *CapTel Inc.* v. *Sorenson Communications Inc.* and *CaptionCall LLC*, Civil Action No. 13-346, Aug. 28, 2013, 26 pages.
Sorenson Communications Inc. and Captioncall LLC, Invalidity Contentions, *Ultratec Inc.* and *CapTel Inc.* v *Sorenson Communications Inc* and *CaptionCall LLC*, Civil Action No. 13-346, Sep. 23, 2013, 31 pages.
Sorenson Communications Inc. and Captioncall LLC, Exhibits to Invalidity Contentions, *Ultratec Inc.* and *CapTel Inc.* v. *Sorenson Communications Inc.* and *CaptionCall LLC*, Civil Action No. 13-346, Sep. 23, 2013, 587 pages.
Sorenson Communications Inc. and Captioncall LLC, Defendants' Answer to Plaintiffs' Original Complaint for Patent Infringement and Counterclaims, *Ultratec Inc.* and *CapTel Inc.* v. *Sorenson Communications Inc.* and *CaptionCall LLC*, Civil Action No. 14-66, Feb. 24, 2014, 41 pages.
Ultratec Inc. and Catel Inc., Plaintiffs' Answer to Defendants' Counterclaims, *Ultratec Inc.* and *CapTel Inc.* v. *Sorenson Communications Inc.* and *CaptionCall LLC*, Civil Action No. 14-CV-66, Mar. 17, 2014, 14 pages.
Ultratec Inc. and Captel Inc., Amended Complaint for Patent Infringement, *Ultratec Inc.* and *CapTel Inc.* v. *Sorenson Communications Inc.* and *CaptionCall LLC*, Civil Action No. 3-14-CV-66-BBC, Mar. 26, 2014, 11 pages.
PCT International Search Report, PCT/US2006/025236, dated Oct. 2, 2006.
PCT International Preliminary Report on Patentability, PCT/US2006/025236, dated Jan. 17, 2008.
PCT International Search Report and Written Opinion, PCT/US2009/040523, dated Nov. 4, 2009.
Cooper, Break Feature for Half Duplex Modem, IBM Technical Disclosure Bulletin, Jan. 1975, vol. 17, No. 8, pp. 2386-2387.
Moskowitz, Telocator Alphanumeric Protocol, Version 1.8, Feb. 4, 1997.
Smith, ASCII to Baudot, Radio Electronics, Mar. 1976, pp. 51-58.
Supnik, et al., Can You Hear Me?—DragonDictate for Windows Minces Words for Your Office, Originally Published in Computer Counselor Column of the May 1995 Issue of the Los Angeles Lawyer Magazine, http://www.supnik.com/voice.htm, accessed Aug. 7, 2012.
Australian Government IP Australia, Examiner's First Report, Application No. 2006263680, dated Jun. 29, 2009.
Applicant, Response to Jun. 29, 2009 Examiner's First Report, Application No. 2006263680, dated Jun. 17, 2010.

European Patent Office, Examination Report, Application No. 06785768.0, dated Aug. 9, 2010.
Applicant, Response to Aug. 9, 2010 Examination Report, Application No. 06785768.0, dated Dec. 20, 2010.
Applicant, Response to Apr. 20, 2012, Official Action, Application No. 2,556,933 in the Canadian Intellectual Property Office, dated Jul. 12, 2012.
United States Patent and Trademark Office, Office Action Summary and Detailed Action, U.S. Appl. No. 12/686,688, dated Nov. 8, 2012.
Canadian Intellectual Property Office, Examiner's Report, Application No. CA 2,419,150, dated Sep. 17, 2009.
Applicant, Response to Sep. 17, 2009 Official Action, Application No. CA 2,419,150, dated Mar. 12, 2010.
United States Patent and Trademark Office, Office Action Summary and Detailed Action, U.S. Appl. No. 09/938,194 (U.S. Pat. No. 6,603,835), dated Jul. 5, 2002.
Applicant, Response (to Jul. 5, 2002 Office Action), U.S. Appl. No. 09/938,194 (U.S. Pat. No. 6,603,835), dated Jan. 6, 2003.
United States Patent and Trademark Office, Notice of Allowance, U.S. Appl. No. 09/938,194 (U.S. Pat. No. 6,603,835), dated Mar. 18, 2003.
IP Australia, Examiner's First Report, Application No. AU 2002313798, dated Oct. 27, 2006.
Applicant, Response to Oct. 27, 2006 Examination Report, Application No. AU 2002313798, dated Feb. 9, 2007.
IP Australia, Notice of Acceptance, Application No. AU 2002313798, dated Apr. 2, 2007.
Canadian Intellectual Property Office, Examiner's Report, Application No. CA 2,458,372, dated Oct. 15, 2009.
Applicant, Response to Oct. 15, 2009 Official Action, Application No. CA 2,458,372, dated Apr. 15, 2010.
Canadian Intellectual Property Office, Notice of Allowance, Application No. CA 2,458,372, dated Jul. 27, 2010.
United Kingdom Patent Office, Examination Report, Application No. GB 0403994.7, dated May 28, 2004.
PCT International Search Report, Application No. PCT/US02/26815, dated Jan. 3, 2003.
PCT Written Opinion, Application No. PCT/US02/26815, dated Apr. 29, 2003.
PCT International Preliminary Examination Report, Application No. PCT/US02/26815, dated Apr. 14, 2004.
United States Patent and Trademark Office, Notice of Allowance and Examiner's Amendment, U.S. Appl. No. 09/956,310 (U.S. Pat. No. 6,510,206), dated Aug. 19, 2002.
Applicant, Applicants' Comments on Examiner's Reason for Allowance (dated Aug. 19, 2002), U.S. Appl. No. 09/956,310 (U.S. Pat. No. 6,510,206), dated Nov. 19, 2002.
United Kingdom Patent Office, Combined Search and Examination Report, Application No. GB 0406768.2 (Patent No. GB 2396774), dated Apr. 27, 2004.
PCT International Search Report, Application No. PCT/US01/29130, dated Mar. 1, 2003.
PCT International Preliminary Examination Report, Application No. PCT/US01/29130, dated Mar. 17, 2003.
United Kingdom Patent Office, Examination Report, Application No. GB 0306458.1, dated Sep. 17, 2003.
Applicant, Response to Sep. 17, 2003 Official Letter, Application No. GB 0306458.1, dated Mar. 16, 2004.
United States Patent and Trademark Office, Office Action Summary and Detailed Action, U.S. Appl. No. 09/977,842 (U.S. Pat. No. 6,549,611), dated Apr. 23, 2002.
Applicant, Response (to Apr. 23, 2002 Office Action), U.S. Appl. No. 09/977,842 (U.S. Pat. No. 6,549,611), dated Oct. 23, 2002.
Applicant, Terminal Disclaimer, U.S. Appl. No. 09/977,842 (U.S. Pat. No. 6,549,611), Oct. 23, 2002.
United States Patent and Trademark Office, Notice of Allowance, U.S. Appl. No. 09/977,842 (U.S. Pat. No. 6,549,611), dated Nov. 15, 2002.
United States Patent and Trademark Office, Office Action, U.S. Appl. No. 10/412,118, dated Nov. 3, 2003.

(56) References Cited

OTHER PUBLICATIONS

United States Patent and Trademark Office, Office Action Summary and Detailed Action, U.S. Appl. No. 10/316,215 (U.S. Pat. No. 6,934,366), dated Jul. 13, 2004.
Applicant, Response (to Jul. 13, 2004 Office Action) and Terminal Disclaimer, U.S. Appl. No. 10/316,215 (U.S. Pat. No. 6,934,366), dated Jan. 13, 2005.
United States Patent and Trademark Office, Notice of Allowance and Detailed Action, U.S. Appl. No. 10/316,215 (U.S. Pat. No. 6,934,366), dated Apr. 18, 2005.
United States Patent and Trademark Office, Office Action Summary and Detailed Action, U.S. Appl. No. 10/348,466 (U.S. Pat. No. 6,748,053), dated Jul. 3, 2003.
Applicant, Response (to Jul. 3, 2003 Office Action) and Terminal Disclaimer, U.S. Appl. No. 10/348,466 (U.S. Pat. No. 6,748,053), dated Jan. 5, 2004.
United States Patent and Trademark Office, Notice of Allowance, U.S. Appl. No. 10/348,466 (U.S. Pat. No. 6,748,053), dated Jan. 27, 2004.
United States Patent and Trademark Office, Office Action Summary and Detailed Action, U.S. Appl. No. 10/436,650 (U.S. Pat. No. 7,164,753), dated Jul. 1, 2005.
Applicant, Amendment (Response to Jul. 1, 2005 Office Action), U.S. Appl. No. 10/436,650 (U.S. Pat. No. 7,164,753), dated Sep. 14, 2005.
United States Patent and Trademark Office, Office Action Summary and Detailed Action, U.S. Appl. No. 10/436,650 (U.S. Pat. No. 7,164,753), dated Nov. 17, 2005.
Applicant, Response (to Nov. 17, 2005 Office Action), U.S. Appl. No. 10/436,650 (U.S. Pat. No. 7,164,753), dated Jan. 18, 2006.
United States Patent and Trademark Office, Office Action Summary and Detailed Action, U.S. Appl. No. 10/436,650 (U.S. Pat. No. 7,164,753), dated Apr. 19, 2006.
Applicant, Response (to Apr. 19, 2006 Office Action), U.S. Appl. No. 10/436,650 (U.S. Pat. No. 7,164,753), dated Jun. 13, 2006.
United States Patent and Trademark Office, Notice of Allowance and Detailed Action, U.S. Appl. No. 10/436,650 (U.S. Pat. No. 7,164,753), dated Sep. 15, 2006.
IP Australia, Examiner's First Report, Application No. AU 2004239790, dated May 14, 2009.
Applicant, Response (to May 14, 2009 Examination Report), Application No. AU 2004239790, dated May 21, 2010.
Government of India the Patent Office, First Examination Report, Application No. 2262/KOLNP/2005, dated Apr. 29, 2008.
Applicant, Response to Apr. 29, 2008 Official Letter, Application No. 2262/KOLNP/2005, dated May 5, 2008.
Applicant, Response to Apr. 29, 2008 First Examination Report, Application No. 2262/KOLNP/2005, dated Oct. 23, 2008.
PCT International Preliminary Reporton Patentability, Application No. PCT/US2004/014991, dated Dec. 1, 2005.
PCT International Search Report and Written Opinion, Application No. PCT/US2004/014991, dated Dec. 29, 2004.
Opinion and Order Regarding Summary Judgment, *Ultratec, Inc., et al.* v. *Sorenson Communications, Inc., et al.*, Civil Action No. 3:13-cv-00346-BBC, United States District Court, Western District of Wisconsin, Aug. 28, 2014.
Additional Opinion and Order Regarding Summary Judgment, *Ultratec, Inc., et al.* v. *Sorenson Communications, Inc., et al.*, Civil Action No. 3:13-cv-00346-BBC, United States District Court, Western District of Wisconsin, Aug. 28, 2014.
Opinion and Order Regarding Claim Construction, Daubert, Motions in Limine, and Secondary Considerations of Nonobviousness, *Ultratec, Inc., et al.* v. *Sorenson Communications, Inc., et al.*, Civil Action No. 3:13-cv-00346-BBC, United States District Court, Western District of Wisconsin, Sep. 29, 2014.
Opinion and Order Regarding Motions in Limine and Correcting Errors in Summary Judgment Order, *Ultratec, Inc., et al.* v. *Sorenson Communications, Inc., et al.*, Civil Action No. 3:13-cv-00346-BBC, United States District Court, Western District of Wisconsin, Oct. 1, 2014.

Opinion and Order Regarding Induced Infringement, *Ultratec, Inc., et al.* v. *Sorenson Communications, Inc., et al.*, Civil Action No. 3:13-cv-00346-BBC, United States District Court, Western District of Wisconsin, Oct. 1, 2014.
Opinion and Order Regarding Motions in Limine, *Ultratec, Inc., et al.* v. *Sorenson Communications, Inc., et al.*, Civil Action No. 3:13-cv-00346-BBC, United States District Court, Western District of Wisconsin, Oct. 3, 2014.
Opinion and Order Regarding Motions in Limine, *Ultratec, Inc., et al.* v. *Sorenson Communications, Inc., et al.*, Civil Action No. 3:13-cv-00346-BBC, United States District Court, Western District of Wisconsin, Oct. 8, 2014.
Opinion and Order Regarding Daubert Motions of Secondary Considerations, *Ultratec, Inc., et al.* v.*Sorenson Communications, Inc., et al.*, Civil Action No. 3:13-cv-00346-BBC, United States District Court, Western District of Wisconsin, Oct. 10, 2014.
Joint Stipulation of Dismissal With Prejudice of Claims and Counterclaims Relating to Claims 1-6 of the '835 Patent and Claim 10 of the '578 Patent, *Ultratec, Inc., et al.* v. *Sorenson Communications, Inc., et al.*, Civil Action No. 3:13-cv-00346-BBC, United States District Court, Western District of Wisconsin, Oct. 13, 2014.
Stipulation Regarding Infringement of Claim 11 of the '578 Patent, *Ultratec, Inc., et al.* v. *Sorenson Communications, Inc., et al.*, Civil Action No. 3:13-cv-00346-BBC, United States District Court, Western District of Wisconsin, Oct. 13, 2014.
Opinion and Order Regarding Motion for Claims Construction, *Ultratec, Inc., et al.* v. *Sorenson Communications, Inc., et al.*, Civil Action No. 3:13-cv-00346-BBC, United States District Court, Western District of Wisconsin, Oct. 21, 2014.
Special Verdict Regarding Liability, *Ultratec, Inc., et al.* v. *Sorenson Communications, Inc., et al.*, Civil Action No. 3:13-cv-00346-BBC, United States District Court, Western District of Wisconsin, Oct. 23, 2014.
Judgment, *Ultratec, Inc., et al.* v. *Sorenson Communications, Inc., et al.*, Civil Action No. 3:13-cv-00346-BBC, United States District Court, Western District of Wisconsin, Nov. 3, 2014.
Defendants' Rule 50(b) Motion for Judgment of Non-lnfringement as a Matter of Law and Rule 59 Motion for New Trial, *Ultratec, Inc., et al.* v. *Sorenson Communications, Inc., et al.*, Civil Action No. 3:13-cv-00346-BBC, United States District Court, Western District of Wisconsin, Nov. 26, 2014.
Defendants' Rule 50(b) Motion for Judgment of Invalidity (Anticipation) and Alternative Rule 59 Motion for New Trial on Anticipation and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014.
Defendants' Rule 59 Motion for New Trial and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014.
Defendants' Rule 50(b) Motion for Judgment of Invalidity Obviousness and Alternative Rule 59 Motion for New Trial on Obviousness and Brief in Support, *Ultratec, Inc., et al.* v. *Sorenson Communications, Inc., et al.*, Civil Action No. 3:13-cv-00346-BBC, United States District Court, Western District of Wisconsin, Dec. 1, 2014 (Redacted).
Opinion and Order Regarding Stay of Litigation, *Ultratec, Inc., et al.* v. *Sorenson Communications, Inc., et al.*, Civil Action No. 3:13-cv-00346-BBC, United States District Court, Western District of Wisconsin, May 13, 2015.
PCT International Search Report, Application No. PCT/US93/04753, dated Aug. 20, 1993.
European Patent Office, Supplementary European Search Report, Application No. EP 93911360 (Patent No. EP 0596078), dated Mar. 27, 1995.
European Patent Office, Communication, Application No. EP 93911360.1 (Patent No. EP 0596078), dated Jul. 10, 1998.
Applicant, Response to Jul. 10, 1998 Communication, Application No. EP 93911360.1 (Patent No. EP 0596078), dated Jan. 20, 1999.
European Patent Office, Communication, Application No. EP 93911360.1 (Patent No. EP 0596078), dated Jun. 16, 1999.

(56) References Cited

OTHER PUBLICATIONS

United States Patent and Trademark Office, Notice of Allowance, Examiner's Amendment, Examiner Interview Summary Record, U.S. Appl. No. 08/129,894 (U.S. Pat. No. 5,432,837), dated Dec. 29, 1994.
United States Patent and Trademark Office, Examiner's Action, U.S. Appl. No. 08/155,061 (U.S. Pat. No. 5,517,548), dated Dec. 22, 1994.
Applicant, Amendment (Response to Dec. 22, 1994 Office Action), U.S. Appl. No. 08/155,061 (U.S. Pat. No. 5,517,548), dated Jun. 22, 1995.
United States Patent and Trademark Office, Notice of Allowance, U.S. Appl. No. 08/155,061 (U.S. Pat. No. 5,517,548), dated Aug. 8, 1995.
European Patent Office, Supplementary European Search Report, Application No. EP 93911361.9 (Patent No. EP 0596079), dated Mar. 27, 1995.
European Patent Office, Communication, Application No. EP 93911361.9 (Patent No. EP 0596079), dated Jul. 10, 1998.
Applicant, Response to Jul. 10, 1998 Communication, Application No. EP 93911361.9 (Patent No. EP 0596079), dated Jan. 20, 1999.
PCT International Search Report, Application No. PCT/US93/04760, dated Aug. 13, 1993.
United States Patent and Trademark Office, Communication, U.S. Appl. No. 07/886,552, dated May 21, 1993.
United States Patent and Trademark Office, Office Action Summary and Detailed Action, U.S. Appl. No. 08/802,053, dated Sep. 30, 1997.
Applicant, Response to Sep. 30, 1997 First Office Action, U.S. Appl. No. 08/802,053, dated Oct. 20, 1997.
United States Patent and Trademark Office, Office Action Summary and Detailed Action, U.S. Appl. No. 18/802,053, dated Jan. 5, 1998.
Applicant, Amendment After Final (Jan. 5, 1998 Office Action), U.S. Appl. No. 08/802,053, dated Feb. 6, 1998.
United States Patent and Trademark Office, Advisory Action, U.S. Appl. No. 08/802,053, dated Feb. 20, 1998.
Applicant, Appellant's Brief on Appeal, U.S. Appl. No. 08/802,053, dated May 29, 1998.
United States Patent and Trademark Office, Examiner's Answer, U.S. Appl. No. 08/802,053, dated Aug. 18, 1998.
United States Patent and Trademark Office, Decision on Appeal, U.S. Appl. No. 08/802,053, dated Oct. 19, 2001.
United States Patent and Trademark Office, Examiner's Action, U.S. Appl. No. 08/258,044 (U.S. Pat. No. 5,604,786), dated Jun. 21, 1995.
Applicant, First Amendment (Response to Jun. 21, 1995 Office Action), U.S. Appl. No. 08/258,044 (U.S. Pat. No. 5,604,786), Sep. 8, 1995.
United States Patent and Trademark Office, Communication, U.S. Appl. No. 08/258,044 (U.S. Pat. No. 5,604,786), dated Dec. 14, 1995.
Applicant, Second Amendment, U.S. Appl. No. 08/258,044 (U.S. Pat. No. 5,604,786), dated Jun. 14, 1996.
Applicant, Third Amendment, U.S. Appl. No. 08/258,044 (U.S. Pat. No. 5,604,786), dated Jul. 31, 1996.
United States Patent and Trademark Office, Notice of Allowance, U.S. Appl. No. 08/258,044 (U.S. Pat. No. 5,604,786), dated Aug. 7, 1996.
United States Patent and Trademark Office, Supplemental Notice of Allowability and Examiner's Amendment, U.S. Appl. No. 08/258,044 (U.S. Pat. No. 5,604,786), dated Nov. 18, 1996.
United States Patent and Trademark Office, Communication, U.S. Appl. No. 08/369,205 (U.S. Pat. No. 5,581,593), dated Nov. 2, 1995.
Applicant, Amendment (Response to Nov. 2, 1995 Office Action), U.S. Appl. No. 08/369,205 (U.S. Pat. No. 5,581,593), dated Feb. 5, 1996.
United States Patent and Trademark Office, Notice of Allowance, Interview Summary, and Examiner's Amendment, U.S. Appl. No. 08/369,205 (U.S. Pat. No. 5,581,593), dated May 15, 1996.

PCT International Search Report, Application No. PCT/US96/00282, dated Apr. 9, 1996.
United States Patent and Trademark Office, Office Action Summary and Detailed Action, U.S. Appl. No. 08/481,852 (U.S. Pat. No. 5,978,654), dated Sep. 5, 1996.
Applicant, Amendment (Response to Sep. 5, 1996 Office Action), U.S. Appl. No. 08/481,852 (U.S. Pat. No. 5,978,654), dated Nov. 26, 1997.
United States Patent and Trademark Office, Office Action Summary and Detailed Action, U.S. Appl. No. 08/481,852 (U.S. Pat. No. 5,978,654), dated Oct. 16, 1998.
Applicant, Response (to Oct. 16, 1998 Office Action), U.S. Appl. No. 08/481,852 (U.S. Pat. No. 5,978,654), dated Apr. 16, 1999.
United States Patent and Trademark Office, Notice of Allowance, U.S. Appl. No. 08/481,852 (U.S. Pat. No. 5,978,654), dated May 5, 1999.
PCT International Search Report, Application No. PCT/US96/09391, dated Aug. 27, 1996.
United States Patent and Trademark Office, Office Action Summary and Detailed Action, U.S. Appl. No. 09/288,420 (U.S. Pat. No. 6,233,314), dated Feb. 25, 2000.
Applicant, Amendment (Response to Feb. 25, 2000 Office Action) and Terminal Disclaimer, U.S. Appl. No. 09/288,420 (U.S. Pat. No. 6,233,314), dated Aug. 25, 2000.
United States Patent and Trademark Office, Notice of Allowance, U.S. Appl. No. 09/288,420 (U.S. Pat. No. 6,233,314), dated Dec. 14, 2000.
United States Patent and Trademark Office, Office Action Summary and Detailed Action, U.S. Appl. No. 09/783,337 (U.S. Pat. No. 6,493,426), dated Dec. 14, 2001.
Applicant, Response to Dec. 14, 2001 Office Action and Terminal Disclaimer, U.S. Appl. No. 09/783,337 (U.S. Pat. No. 6,493,426), dated Jun. 14, 2002.
United States Patent and Trademark Office, Notice of Allowance and Examiner's Statement of Reasons for Allowance, U.S. Appl. No. 09/783,337 (U.S. Pat. No. 6,493,426), dated Jul. 25, 2002.
United Kingdom Patent Office, Examination Report, Application No. GB 0319142.6 (Patent No. GB 2389993), dated Jan. 13, 2004.
Canadian Intellectual Property Office, Examiner's Report, Application No. CA 2,438,412, dated May 20, 2009.
Applicant, Response to May 20, 2009 Official Action, Application No. CA 2,438,412, dated Nov. 18, 2009.
Canadian Intellectual Property Office, Notice of Allowance, Application No. CA 2,438,412, dated Apr. 30, 2010.
Opinion and Order, *Ultratec, Inc, et al.* v *Sorenson Communications, Inc., et al.*, Civil Action No. 13-CV-346-BBC, United States District Court, Western District of Wisconsin, Aug. 28, 2014.
CaptionCall L.L.C. Petition for Inter Partes Review of Claims 11-13 of U.S. Pat. No. 7,660,398 Under 35 U.S.C. 311-319 and 37 C.F.R. 42.100 Et Seq., Aug. 13, 2014, 64 pages.
Prosecution History of the U.S. Pat. No. 7,660,398, 489 pages.
Vaseghi, Chapter 14: Echo Cancellation, Advanced Digital Signal Processing and Noise Reduction, Second Edition, John Wiley & Sons, Ltd., 2000, pp. 396-415.
Ultratec, Inc. and CapTel, Inc. Complaint for Patent Infringement, *Ultratec, Inc.* and *CapTel Inc.* v. *Sorenson Communications, Inc.* and *CaptionCall, LLC*, Civil Action No. 14-CV-66, Feb. 3, 2014, 9 pages.
Plaintiffs, Ultratec, Inc. and CapTel, Inc.'s Infringement Contentions, *Ultratec, Inc.* and *CapTel Inc.* v. *Sorenson Communications, Inc.* and *CaptionCall, LLC*, Civil Action No. 14-CV-66, Mar. 28, 2014, 9 pages.
Declaration of Benedict J. Occhiogrosso, In Re: U.S. Pat. No. 7,660,398, United States Patent and Trademark Office Before the Patent Trial and Appeal Board, Aug. 13, 2014, 62 pages.
United States Patent and Trademark Office, Office Action Summary and Detailed Action, U.S. Appl. No. 13/486,221, dated Jan. 28, 2015, 8 pages.
United States Patent and Trademark Office, Office Action Summary and Detailed Action, U.S. Appl. No. 14/506,080, dated Feb. 27, 2015, 7 pages.

(56) References Cited

OTHER PUBLICATIONS

United States Patent and Trademark Office, Office Action Summary and Detailed Action, U.S. Appl. No. 14/299,531, dated Sep. 19, 2014, 8 pages.
Applicant, Amendment (Response to Sep. 19, 2014, Office Action), U.S. Appl. No. 14/299,531, dated Sep. 24, 2014, 12 pages.
United States Patent and Trademark Office, Office Action Summary and Detailed Action, U.S. Appl. No. 14/299,531, dated Oct. 10, 2014, 6 pages.
Applicant, Response (Response to Oct. 10, 2014, Office Action), U.S. Appl. No. 14/299,531, dated Oct. 17, 2014, 3 pages.
United States Patent and Trademark Office, Office Action Summary and Detailed Action, U.S. Appl. No. 14/299,651, dated Oct. 16, 2014, 5 pages.
Applicant, Response (Response to Oct. 16, 2014, Office Action), U.S. Appl. No. 14/299,651, dated Oct. 17, 2014, 3 pages.
United States Patent and Trademark Office, Office Action Summary and Detailed Action, U.S. Appl. No. 13/950,860, dated Sep. 3, 2014, 9 pages.
Applicant, Amendment (Response to Sep. 3, 2014, Office Action), U.S. Appl. No. 13/950,860, dated Mar. 3, 2015, 11 pages.
United States Patent and Trademark Office, Office Action Summary and Detailed Action, U.S. Appl. No. 13/950,860, dated Apr. 2, 2015, 8 pages.
United States Patent and Trademark Office, Office Action Summary and Detailed Action, U.S. Appl. No. 15/010,179, dated Jul. 9, 2019, 12 pages.
Petition for Inter Partes Review for Patent No. 10,469,660, *CaptionCall, LLC* v. *Ultratec, Inc.*, United States Patent and Trademark Office Before the Patent Trial and Appeal Board, Jul. 1, 2020, 68 pages.
Declaration of Benedict J. Occhiogrosso for U.S. Pat. No. 10,469,660, *CaptionCall, LLC* v. *Ultratec, Inc.*, United States Patent and Trademark Office Before the Patent Trial and Appeal Board, Jun. 23, 2020, 113 pages.
U.S. Appl. No. 60/562,795 to McLaughlin et al., filed Apr. 16, 2004, 126 pages.
Blackberry, RIM Introduces New Color BlackBerry Handheld for CDMA2000 1X Wireless Networks, BlackBerry Press Release, Mar. 22, 2004, 2 pages.
Blackberry Wireless Handheld User Guide, 7750, Mar. 16, 2004, 144 pages.
Federal Communications Commission, Telecommunication Relay Services and Speech-to-Speech Services for Individuals With Hearing and Speech Disabilities, 68 Fed. Reg. 50973-50978 (Aug. 25, 2003).
PHONEDB, RIM BlackBerry 7750 Device Specs, Copyright 2006-2020 PhoneDB, 6 pages.
PHONESDATA, Nokia 6620 Specs, Review, Opinions, Comparisons, Copyright 2020, 9 pages.
SUNDGOT, Nokia Unveils the 6600, InfoSync World, Jun. 16, 2003, 2 pages.
Wikipedia, Dell Axim, https://en.wikipedia.org/wiki/Dell_Axim, Last Edited on Feb. 23, 2020, 4 pages.
Wikipedia, Palm Tungsten, https://en.wikipedia.org/wiki/Palm_Tungsten, Last Edited on Oct. 6, 2019, 10 pages.
Final Written Decision, Patent No. 9,131,045, Case IPR2015-01889, *CaptionCall, LLC* v. *Ultratec, Inc.*, United States Patent and Trademark Office Before the Patent Trial and Appeal Board, Apr. 11, 2017, 118 pages.
Judgment, U.S. Pat. No. 7,881,441, Case IPR2015-01886, *CaptionCall, LLC* v. *Ultratec, Inc.*, United States Patent and Trademark Office Before the Patent Trial and Appeal Board, Jun. 9, 2016, 4 pages.
Petition for Inter Partes Review for Patent No. 10,491,746, *CaptionCall, LLC* v. *Ultratec, Inc.*, United States Patent and Trademark Office Before the Patent Trial and Appeal Board, Jul. 1, 2020, 61 pages.
Declaration of Benedict J. Occhiogrosso for U.S. Pat. No. 10,491,746, *CaptionCall, LLC* v. *Ultratec, Inc.*, United States Patent and Trademark Office Before the Patent Trial and Appeal Board, Jun. 23, 2020, 79 pages.

Arlinger, Negative Consequences of Uncorrected Hearing Loss—A Review, International Journal of Audiology, 2003, 42:2S17-2S20.
Petition for Inter Partes Review for U.S. Pat. No. 10,587,751, *CaptionCall, LLC* v. *Ultratec, Inc.*, United States Patent and Trademark Office Before the Patent Trial and Appeal Board, Jul. 1, 2020, 64 pages.
Declaration of Benedict J. Occhiogrosso for Patent No. 10,587,751, *CaptionCall, LLC* v. *Ultratec, Inc.*, United States Patent and Trademark Office Before the Patent Trial and Appeal Board, Jun. 23, 2020, 106 pages.
Curtis et al., Doctor-Patient Communication on the Telephone, Can Fam Physician, 1989, 35:123-128.
In the United States Patent and Trademark Office Before the Patent Trial and Appeal Board, Petition for Inter Partes Review of Claims 1-29 of U.S. Pat. No. 8,917,822, *CaptionCall LLC* v. *Ultratec Inc.*, Case IPR2015-00636, U.S. Pat. No. 8,917,822, Jan. 29, 2015, 67 pages.
In the United States Patent and Trademark Office Before the Patent Trial and Appeal Soard, Patent Owner's Preliminary Response, *CaptionCall LLC* v. *Ultratec Inc.*, Case IPR2015-00636, U.S. Pat. No. 8,917,822, Jun. 9, 2015, 66 pages.
In the United States Patent and Trademark Office Before the Patent Trial and Appeal Board, Decision Instituting Review, *CaptionCall LLC* v. *Ultratec Inc.*, Case IPR2015-00636, U.S. Pat. No. 8,917,822, Sep. 8, 2015, 20 pages.
In the United States Patent and Trademark Office Before the Patent Trial and Appeal Board, Patent Owner Response, *CaptionCall LLC* v. *Ultratec Inc.*, Case IPR2015-00636, U.S. Pat. No. 8,917,822, Nov. 23, 2015, 65 pages.
In the United States Patent and Trademark Office Before the Patent Trial and Appeal Soard, Patent Owner's Contingent Motion to Amend, *CaptionCall LLC* v. *Ultratec Inc.*, Case IPR2015-00636, U.S. Pat. No. 8,917,822, Nov. 23, 2015, 39 pages.
In the United States Patent and Trademark Office Before the Patent Trial and Appeal Soard, Petitioner's Reply to Patent Owner Response, *CaptionCall LLC* v. *Ultratec Inc.*, Case IPR2015-00636, U.S. Pat. No. 8,917,822, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC* v. *Ultratec Inc.*, Case IPR2015-00636, U.S. Pat. No. 8,917,822, Jan. 26, 2016, 28 pages.
Declaration of Benedict J. Occhiogrosso, In Re: U.S. Pat. No. 8,917,822, Case IPR2015-00636, In the United States Patent and Trademark Office Before the Patent Trial and Appeal Board, Jan. 29, 2015, 65 pages.
Supplemental Declaration of Benedict J. Occhiogrosso, In Re: U.S. Pat. No. 8,917,822, Case IPR2015-00636, In the United States Patent and Trademark Office Before the Patent Trial and Appeal Board, Jan. 26, 2016, 60 pages.
Declaration of Ivan Zatkovich, In Re: U.S. Pat. No. 8,917,822, Case IPR2015-00636, In the United States Patent and Trademark Office Before the Patent Trial and Appeal Board, Nov. 23, 2015, 108 pages.
Declaration of Paul Ludwick Regarding Secondary Considerations of Non-Obviousness, In Re: U.S. Pat. No. 8,917,822, Case IPR2015-00636, In the United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,917,822, Case IPR2015-00636, In the United States Patent and Trademark Office Before the Patent Trial and Appeal Board, Nov. 23, 2015, 61 pages.
Declaration of Katie Kretschman, In Re: U.S. Pat. No. 8,917,822, Case IPR2015-00636, In the United States Patent and Trademark Office Before the Patent Trial and Appeal Board, Nov. 23, 2015, 5 pages.
In the United States Patent and Trademark Office Before the Patent Trial and Appeal Soard, Petition for Inter Partes Review of Claims 1-30 of U.S. Pat. No. 8,908,838, *CaptionCall LLC* v. *Ultratec Inc.*, Case IPR2015-00637, U.S. Pat. No. 8,908,838, Jan. 29, 2015, 67 pages.
In the United States Patent and Trademark Office Before the Patent Trial and Appeal Soard, Patent Owner's Preliminary Response,

(56) References Cited

OTHER PUBLICATIONS

*CaptionCall LLC v. Ultratec Inc.*, Case IPR2015-00637, Patent 8,908,838, Jun. 9, 2015, 65 pages.
In the United States Patent and Trademark Office Before the Patent Trial and Appeal Soard, Decision Instituting Review, *CaptionCall LLC v. Ultratec Inc.*, Case IPR2015-00637, U.S. Pat. No. 8,908,838, Sep. 8, 2015, 25 pages.
In the United States Patent and Trademark Office Before the Patent Trial and Appeal Board, Patent Owner Response, *CaptionCall LLC v. Ultratec Inc.*, Case IPR2015-00637, U.S. Pat. No. 8,908,838, Nov. 23, 2015, 65 pages.
In the United States Patent and Trademark Office Before the Patent Trial and Appeal Soard, Patent Owner's Contingent Motion to Amend, *CaptionCall LLC v. Ultratec Inc.*, Case IPR2015-00637, U.S. Pat. No. 8,908,838, Nov. 23, 2015, 38 pages.
In the United States Patent and Trademark Office Before the Patent Trial and Appeal Soard, Petitioner's Reply to Patent Owner Response, *CaptionCall LLC v. Ultratec Inc.*, Case IPR2015-00637, U.S. Pat. No. 8,908,838, Jan. 26, 2016, 29 pages.
In the United States Patent and Trademark Office Before the Patent Trial and Appeal Board, Petitioner's Opposition to Patent Owner's Contingent Motion to Amend, *CaptionCall LLC v. Ultratec Inc.*, Case IPR2015-00637, U.S. Pat. No. 8,908,838, Jan. 26, 2016, 28 pages.
Declaration of Benedict J. Occhiogrosso, In Re: U.S. Pat. No. 8,908,838, Case IPR2015-00637, In the United States Patent and Trademark Office Before the Patent Trial and Appeal Board, Jan. 29, 2015, 62 pages.
Supplemental Declaration of Benedict J. Occhiogrosso, In Re: U.S. Pat. No. 8,908,838, Case IPR2015-00637, In the United States Patent and Trademark Office Before the Patent Trial and Appeal Board, Jan. 26, 2016, 62 pages.
Declaration of Ivan Zatkovich, In Re: U.S. Pat. No. 8,908,838, Case IPR2015-00637, In the United States Patent and Trademark Office Before the Patent Trial and Appeal Board, Nov. 23, 2015, 110 pages.
Declaration of Paul Ludwick Regarding Secondary Considerations of Non-Obviousness, In Re: U.S. Pat. No. 8,908,838, Case IPR2015-00637, In the United States Patent and Trademark Office Before the Patent Trial and Appeal Board, Nov. 23, 2015, 37 pages.
Declaration of Brenda Battat Regarding Secondary Considerations of Non-Obviousness, In Re: U.S. Pat. No. 8,908,838, Case IPR2015-00637, In the United States Patent and Trademark Office Before the Patent Trial and Appeal Board, Nov. 24, 2015, 61 pages.
Declaration of Katie Kretschman, In Re: U.S. Pat. No. 8,908,838, Case IPR2015-00637, In the United States Patent and Trademark Office Before the Patent Trial and Appeal Board, Nov. 23, 2015, 5 pages.
In the United States Patent and Trademark Office Before the Patent Trial and Appeal Board, Petition for Inter Partes Review of Claims 1-74 of U.S. Pat. No. 9,131,045, *CaptionCall LLC v. Ultratec Inc.*, Case IPR2015-01889, U.S. Pat. No. 9,131,045, Sep. 9, 2015, 66 pages.
In the United States Patent and Trademark Office Before the Patent Trial and Appeal Board, Patent Owner's Preliminary Response, *CaptionCall LLC v. Ultratec Inc.*, Case IPR2015-01889, U.S. Pat. No. 9,131,045, Dec. 18, 2015, 26 pages.
Declaration of Benedict J. Occhiogrosso, In Re: U.S. Pat. No. 9,131,045, Case IPR2015-01889, In the United States Patent and Trademark Office Before the Patent Trial and Appeal Board, Sep. 9, 2015, 63 pages.
Intellectual Property Philippines, Official Action, Application No. PH 12005502024, dated Aug. 10, 2007.
Applicant, Response to Aug. 10, 2007 Official Action, Application No. PH 12005502024, dated Oct. 3, 2007.
Intellectual Property Philippines, Official Action, Application No. PH 12005502024, dated Oct. 17, 2007.
Applicant, Response to Oct. 17, 2007 Official Action, Application No. PH 12005502024, dated Dec. 11, 2007.

United States Patent and Trademark Office, Office Action Summary and Detailed Action, U.S. Appl. No. 10/619,040 (U.S. Pat. No. 7,006,604), dated Dec. 2, 2004.
Applicant, Response (to Dec. 2, 2004 Office Action) and Terminal Disclaimer, U.S. Appl. No. 10/619,040 (U.S. Pat. No. 7,006,604), dated Jun. 2, 2005.
United States Patent and Trademark Office, Notice of Allowance, U.S. Appl. No. 10/619,040 (U.S. Pat. No. 7,006,604), dated Sep. 16, 2005.
United States Patent and Trademark Office, Supplemental Notice of Allowability, Examiner's Amendment and Interview Summary, U.S. Appl. No. 10/628,193 (U.S. Pat. No. 6,885,731), dated Jan. 31, 2005.
United States Patent and Trademark Office, Office Action Summary and Detailed Action, U.S. Appl. No. 10/634,965 (U.S. Pat. No. 7,003,082), dated Jul. 16, 2004.
Applicant, Response (to Jul. 16, 2004 Office Action) and Terminal Disclaimer, U.S. Appl. No. 10/634,965 (U.S. Pat. No. 7,003,082), dated Jan. 14, 2005.
United States Patent and Trademark Office, Supplemental Notice of Allowability, U.S. Appl. No. 10/634,965 (U.S. Pat. No. 7,003,082), dated Nov. 9, 2005.
United States Patent and Trademark Office, Office Action Summary and Detailed Action, U.S. Appl. No. 11/061,682 (U.S. Pat. No. 7,660,398), dated Apr. 1, 2008.
Applicant, Amendment (Response to Apr. 1, 2008 Office Action), U.S. Appl. No. 11/061,682 (U.S. Pat. No. 7,660,398), dated Jul. 1, 2008.
United States Patent and Trademark Office, Office Action Summary and Detailed Action, U.S. Appl. No. 11/061,682 (U.S. Pat. No. 7,660,398), dated Nov. 4, 2008.
Applicant, Request for Continued Examination and Interview Summary, U.S. Appl. No. 11/061,682 (U.S. Pat. No. 7,660,398), dated Jan. 22, 2009.
United States Patent and Trademark Office, Office Action Summary and Detailed Action, U.S. Appl. No. 11/061,682 (U.S. Pat. No. 7,660,398), ated Mar. 25, 2009.
Applicant, Amendment, U.S. Appl. No. 11/061,682 (U.S. Pat. No. 7,660,398), dated Jun. 22, 2009.
United States Patent and Trademark Office, Notice of Allowance, U.S. Appl. No. 11/061,682 (U.S. Pat. No. 7,660,398), dated Sep. 25, 2009.
Applicant, Request for Recalculation of Patent Term Adjustment in View of Wyeth, U.S. Pat. No. 7,660,398, (U.S. Appl. No. 11/061,682), dated Feb. 25, 2010.
United States Patent and Trademark Office, Decision on Request for Recalculation of Patent Term Adjustment in View of Wyeth and Notice of Intent to Issue Certificate of Correction, Patent No. 7,660,398 (U.S. Appl. No. 11/061,682), dated Apr. 20, 2010.
United States Patent and Trademark Office, Certificate of Correction, U.S. Pat. No. 7,660,398 (U.S. Appl. No. 11/061,682), Nov. 30, 2010.
PCT International Search Report and Written Opinion, Application No. PCT/US2005/005149, dated May 24, 2005.
PCT International Preliminary Report on Patentability, Application No. PCT/US2005/005149, dated Aug. 31, 2006.
UK Intellectual Property Office, Examination Report, Application No. GB 0617585.5, dated Jan. 23, 2008.
Applicant, Response to Jan. 23, 2008 Official Letter, Application No. GB 0617585.5, dated Jul. 22, 2008.
UK Intellectual Property Office, Combined Search and Examination Report, Application No. GB 0617585.5, dated Aug. 15, 2008.
Applicant, Response to Aug. 15, 2008 Official Letter, Application No. GB 0617585.5, dated Dec. 9, 2008.
UK Intellectual Property Office, Combined Search and Examination Report, Application No. GB 0813502.2, dated Aug. 15, 2008.
Applicant, Response to Aug. 15, 2008 Official Letter, Application No. GB 0813502.2, dated Dec. 9, 2008.
United States Patent and Trademark Office, Office Action Summary and Detailed Action, U.S. Appl. No. 11/257,703 (U.S. Pat. No. 7,319,740), dated May 3, 2007.

(56) References Cited

OTHER PUBLICATIONS

Applicant, Amendment and Terminal Disclaimers (Response to May 3, 2007 Office Action), U.S. Appl. No. 11/257,703 (U.S. Pat. No. 7,319,740), dated Jul. 26, 2007.
United States Patent and Trademark Office, Notice of Allowance, U.S. Appl. No. 11/257,703 (U.S. Pat. No. 7,319,740), dated Aug. 23, 2007.
United States Patent and Trademark Office, Office Action Summary and Detailed Action, U.S. Appl. No. 08/217,518 (U.S. Pat. No. 5,724,405), dated Jul. 20, 1995.
Applicant, Amendment (Response to Jul. 20, 1995 Office Action), U.S. Appl. No. 08/217,518 (U.S. Pat. No. 5,724,405), dated Jan. 22, 1996.
United States Patent and Trademark Office, Office Action Summary and Detailed Action, U.S. Appl. No. 08/217,518 (U.S. Pat. No. 5,724,405), dated Apr. 16, 1996.
Applicant, Amendment (Response to Apr. 16, 1996 Office Action) and Terminal Disclaimer, U.S. Appl. No. 08/217,518 (U.S. Pat. No. 5,724,405), dated Oct. 16, 1996.
United States Patent and Trademark Office, Office Action Summary and Detailed Action, U.S. Appl. No. 08/217,518 (U.S. Pat. No. 5,724,405), dated Jan. 15, 1997.
Applicant, Response After Final (Response to Jan. 15, 1997 Office Action) and Terminal Disclaimer, U.S. Appl. No. 08/217,518 (U.S. Pat. No. 5,724,405), dated Jul. 15, 1997.
United States Patent and Trademark Office, Notice of Allowability, U.S. Appl. No. 08/217,518 (Patent No. 5,724,405), dated Aug. 19, 1997.
United Kingdom Patent Office, Search Report, Application No. GB 9804556.0 (Patent No. GB 2335109), dated Aug. 12, 1998.
United Kingdom Patent Office, Examination Report, Application No. GB 9804556.0 (Patent No. GB 2335109), dated Sep. 27, 2002.
Applicant, Response to United Kingdom Patent Office Sep. 27, 2002 Examination Report, Application No. GE 9804556 0 (Patent No. GB 2335109), dated Mar. 26, 2003.
United States Patent and Trademark Office, Notice of Allowability, U.S. Appl. No. 08/925,558 (U.S. Pat. No. 5,909,482), dated Oct. 27, 1998.
United Kingdom Patent Office, Examination Report, Application No. GB 9908312.3 (Patent No. GB 2334177), dated Apr. 15, 2002.
Applicant, Response to United Kingdom Patent Office Apr. 15, 2002 Examination Report, Application No. GB 9908312.3 (Patent No. GB 2334177), dated Oct. 14, 2002.
PCT International Search Report, Application No. PCT/US98/18650, daetd Nov. 6, 1998.
Canadian Intellectual Property Office, Examination Report, Application No. CA 2,268,582, dated Feb. 22, 2007.
Applicant, Amendment/Remarks Following Feb. 22, 2007 Examiner's Report, Application No. CA 2,268,582, dated Aug. 22, 2007.
United States Patent and Trademark Office, Notice of Allowance, Examiner's Amendment, Examiner Interview Summary Record, U.S. Appl. No. 07/074,625 (U.S. Pat. No. 4,777,469), dated May 20, 1988.
Canadian Patent Office, Notice of Allowance, Application No. CA 571,452 (U.S. Pat. No. 1,301,388), dated Jan. 29, 1991.
Applicant, Restoration and Amendment, Application No. CA 571,452 (Patent No. 1,301,388), dated Aug. 8, 1991.
United States Patent and Trademark Office, Communication, U.S. Appl. No. 07/224,118 (U.S. Pat. No. 4,897,868), Jun. 8, 1989.
Applicant, Amendment (Response to Jun. 8, 1989 Office Action) and Terminal Disclaimer, U.S. Appl. No. 07/224,118 (U.S. Pat. No. 4,897,868), dated Jun. 19, 1989.
United States Patent and Trademark Office, Notice of Allowance, U.S. Appl. No. 07/224,118 (U.S. Pat. No. 4,897,868), dated Aug. 29, 1989.
United States Patent and Trademark Office, Communication, U.S. Appl. No. 07/334,003 (U.S. Pat. No. 4,959,847), dated Oct. 10, 1989.
Applicant, Amendment (Response to Oct. 10, 1989 Office Action), U.S. Appl. No. 07/334,003 (U.S. Pat. No. 4,959,847), dated Jan. 10, 1990.
United States Patent and Trademark Office, Notice of Allowance, U.S. Appl. No. 07/334,003 (U.S. Pat. No. 4,959,847), dated Mar. 27, 1990.
United Kingdom Patent Office, Examiner's Search Report, Application No. GB 9006994.9 (Patent No. GB 2,231,468), dated Jul. 12, 1990.
United Kingdom Patent Office, Examiner's Report, Application No. GB 9006994.9 (Patent No. GB 2,231,468), dated Dec. 16, 1992.
Applicant, Response to Dec. 16, 1992 Official Letter, Application No. GB 9006994.9 (Patent No. GB 2,231,468), dated Jun. 11, 1993.
Canadian Intellectual Property Office, Examination Report, Application No. CA 2,013,617, dated Jul. 28, 2000.
Applicant, Response to Jul. 28, 2000 Official Action, Application No. CA 2,013,617, dated Nov. 28, 2000.
Applicant, Information Letter, Application No. CA 2,013,617, Feb. 1, 2001.
Canadian Intellectual Property Office, Notice of Allowance, Application No. CA 2,013,617, dated Mar. 23, 2001.
United States Patent and Trademark Office, Communication, U.S. Appl. No. 07/842,943 (U.S. Pat. No. 5,351,288), dated Oct. 22, 1993.
Applicant, Amendment (Response to Oct. 22, 1993 Office Action) and Terminal Disclaimer, U.S. Appl. No. 07/842,943 (U.S. Pat. No. 5,351,288), dated Jan. 13, 1994.
United States Patent and Trademark Office, Communication, U.S. Appl. No. 07/842,943 (U.S. Pat. No. 5,351,288), dated Mar. 30, 1994.
Applicant, Response to Mar. 30, 1994 Final Rejection, U.S. Appl. No. 07/842,943 (U.S. Pat. No. 5,351,288), dated Apr. 12, 1994.
Applicant, Supplemental Response to Final Rejection and Terminal Disclaimer, U.S. Appl. No. 07/842,943 (U.S. Pat. No. 5,351,288), dated Apr. 28, 1994.
United States Patent and Trademark Office, Notice of Allowance, U.S. Appl. No. 07/842,943 (U.S. Pat. No. 5,351,288), dated Jun. 6, 1994.
United States Patent and Trademark Office, Communication, U.S. Appl. No. 07/255,357, dated May 3, 1989.
Applicant, Amendment (Response to May 3, 1989 Office Action), U.S. Appl. No. 07/255,357, dated Aug. 3, 1989.
United States Patent and Trademark Office, Communication, U.S. Appl. No. 07/255,357, dated Oct. 16, 1989.
Applicant, Amendment (Response to Oct. 16, 1989 Office Action), U.S. Appl. No. 07/255,357, dated Apr. 16, 1990.
United States Patent and Trademark Office, Communication, U.S. Appl. No. 07/255,357, dated Jul. 16, 1990.
Applicant, Response After Final, U.S. Appl. No. 07/255,357, dated Oct. 16, 1990.
United States Patent and Trademark Office, Advisory Action, U.S. Appl. No. 07/255,357, dated Nov. 6, 1990.
United States Patent and Trademark Office, Examiner's Action, U.S. Appl. No. 07/886,553 (U.S. Pat. No. 5,325,417), dated May 21, 1993.
Applicant, First Amendment (Response to May 21, 1993 Office Action), U.S. Appl. No. 07/886,553 (U.S. Pat. No. 5,325,417), dated Oct. 21, 1993.
United States Patent and Trademark Office, Notice of Allowance, U.S. Appl. No. 07/886,553 (U.S. Pat. No. 5,325,417), dated Jan. 4, 1994.
European Patent Office, Communication, Application No. EP 93911359.3 (Patent No. EP 0608389), dated Jul. 10, 1998.
Applicant, Response to Jul. 10, 1998 Communication, Application No. EP 93911359.3 (Patent No. EP 0608389), dated Jan. 19, 1999.
Canadian Intellectual Property Office, Notice of Allowance, Application No. CA 2,113,841, dated Jun. 10, 2002.
PCT International Search Report, Application No. PCT/US93/04751, dated Aug. 18, 1993.
United States Patent and Trademark Office, Examiner's Action, U.S. Appl. No. 29/024,266 (U.S. Pat. No. D. 364,865), dated Mar. 30, 1995.

(56) References Cited

OTHER PUBLICATIONS

Applicant, Response to First Office Action, U.S. Appl. No. 29/024,266 (U.S. Pat. No. D. 364,865), May 16, 1995.
United States Patent and Trademark Office, Notice of Allowance, U.S. Appl. No. 29/024,266 (U.S. Pat. No. D. 364,865), dated Jun. 7, 1995.
United States Patent and Trademark Office, Office Action Summary and Detailed Action, U.S. Appl. No. 29/076,383 (U.S. Pat. No. D. 405,793), dated Apr. 14, 1998.
Applicant, First Amendment (Response to Apr. 14, 1998 Office Action), U.S. Appl. No. 29/076,383 (U.S. Pat. No. D. 405,793), dated Jul. 14, 1998.
United States Patent and Trademark Office, Notice of Allowance and Examiner's Amendment, U.S. Appl. No. 29/076,383 (U.S. Pat. No. D. 405,793), dated Aug. 10, 1998.
Applicant, Preliminary Response to United States Patent and Trademark Office, U.S. Appl. No. 07/616,720 (U.S. Pat. No. 5,081,673), dated Dec. 31, 1990.
United States Patent and Trademark Office, Notice of Allowance, U.S. Appl. No. 07/616,720 (U.S. Pat. No. 5,081,673), dated Mar. 7, 1991.
Canadian Intellectual Property Office, Notice of Allowance, Patent No. CA 1320602, dated Oct. 27, 1992.
United States Patent and Trademark Office, Examiner's Action, U.S. Appl. No. 07/886,642 (U.S. Pat. No. 5,327,479), dated May 19, 1993.
Applicant, First Amendment (Response to May 19, 1993 Office Action), U.S. Appl. No. 07/886,642 (U.S. Pat. No. 5,327,479), dated Oct. 19, 1993.
United States Patent and Trademark Office, Notice of Allowance and Examiner Interview Summary Record, U.S. Appl. No. 07/886,642 (U.S. Pat. No. 5,327,479), dated Jan. 5, 1994.
Canadian Intellectual Property Office, Notice of Allowance, Application No. CA 2,113,839, dated Jun. 18, 2002.
Defendants' Answer to Plaintiffs' Second Amended Complaint for Patent Infringement and Counterclaims, *Ultratec, Inc., et al.* v. *Sorenson Communications, Inc., et al.*, Civil Action No. 3:14-cv-00066-BBC, United States District Court, Western District of Wisconsin, May 9, 2014.
Defendants' Notion of Motion and Motion for Summary Judgment Regarding U.S. Pat. No. 7,660,398, *Ultratec, Inc., et al.* v. *Sorenson Communications, Inc., et al.*, Civil Action No. 3:14-cv-00066-JDP, United States District Court, Western District of Wisconsin, Mar. 27, 2015.
Brief No. 1 in Support of Defendants' Motion for Summary Judgment (Indefiniteness and Claim Construction), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 2 in Support of Defendants' Motion for Summary Judgment (Non-Infringement and Invalidity Under 35 USC 102 and 103), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, May 11, 2015 (Redacted).
Reply in Support of Brief No. 3 in Support of Defendants' Motion for Summary Judgment (No Injunction, No Willful Infringement, No Indirect Infringement, and No Infringement of Claims 1-3 of the '398 Patent), *Ultratec, Inc., et al.* v. *Sorenson Communications, Inc., et al.*, Civil Action No. 3:14-cv-00066-JDP, United States District Court, Western District of Wisconsin, Jun. 24, 2015 (Redacted).
Claim Construction and Summary Judgement Opinion and Order, *Ultratec, Inc.*, et al. v. *Sorenson Communications, Inc., et al.*, Civil Action No. 3:14-cv-00066-JDP, United States District Court, Western District of Wisconsin, Sep. 11, 2015.

Final Pretrial Conference and Order, *Ultratec, Inc., et al.* v. *Sorenson Communications, Inc., et al.*, Civil Action No. 3:14-cv-00066-JDP, United States District Court, Western District of Wisconsin, Sep. 21, 2015.
Order of Plaintiffs' Motion in Limine 16, *Ultratec, Inc., et al.* v. *Sorenson Communications, Inc., et al.*, Civil Action No. 3:14-cv-00066-JDP, United States District Court, Western District of Wisconsin, Sep. 22, 2015.
*Order, Ultratec, Inc., et al.* v. *Sorenson Communications, Inc., et al.*, Civil Action No. 3:14-cv-00066-JDP, United States District Court, Western District of Wisconsin, Oct. 6, 2015.
Special Verdict Form—Liability, *Ultratec, Inc., et al.* v. *Sorenson Communications, Inc., et al.*, Civil Action No. 3:14-ov-00066-JDP, United States District Court, Western District of Wisconsin, Oct. 6, 2015.
Judgment in a Civil Case, *Ultratec, Inc., et al.* v. *Sorenson Communications, Inc., et al.*, Civil Action No. 3:14-cv-00066-JDP, United States District Court, Western District of Wisconsin, Oct. 15, 2015.
United States Patent and Trademark Office, Office Action Summary and Detailed Action, U.S. Appl. No. 08/946,538 (U.S. Pat. No. 6,075,841), dated Sep. 18, 1998.
Applicant, First Amendment (Response to Sep. 18, 1998 Office Action), U.S. Appl. No. 08/946,538 (U.S. Pat. No. 6,075,841), dated Jan. 15, 1999.
United States Patent and Trademark Office, Office Action Summary and Detailed Action, U.S. Appl. No. 08/946,538 (U.S. Pat. No. 6,075,841), dated Mar. 26, 1999.
Applicant, Response to Mar. 26, 1999 Office Action and Terminal Disclaimer, U.S. Appl. No. 08/946,538 (U.S. Pat. No. 6,075,841), dated Jul. 20, 1999.
United States Patent and Trademark Office, Notice of Allowability and Examiner's Amendment and Statement of Reasons for Allowance, U.S. Appl. No. 08/946,538 (U.S. Pat. No. 6,075,841), dated Aug. 16, 1999.
United States Patent and Trademark Office, Office Action Summary and Detailed Action, U.S. Appl. No. 09/034,076 (U.S. Pat. No. 6,075,842), dated Apr. 6, 1999.
Applicant, Response to Apr. 6, 1999 Office Action and Terminal Disclaimer, U.S. Appl. No. 09/034,076 (U.S. Pat. No. 6,075,842), dated Jul. 21, 1999.
United States Patent and Trademark Office, Notice of Allowability, U.S. Appl. No. 09/034,076 (U.S. Pat. No. 6,075,842), dated Jan. 7, 2000.
United States Patent and Trademark Office, Notice of Allowability and Examiner's Statement of Reasons for Allowance, U.S. Appl. No. 09/108,790 (U.S. Pat. No. 5,974,116), dated May 11, 1999.
Canadian Intellectual Property Office, Examination Report, Application No. CA 2,268,383, dated May 10, 2007.
Applicant, Response to May 10, 2007 Office Action, Application No. CA 2,268,383, dated Nov. 9, 2007.
United Kingdom Patent Office, Examination Report, Application No. GB 9908310.7 (Patent No. GB 2339363), dated Jan. 25, 2003.
Applicant, Response to United Kingdom Patent Office Jan. 25, 2003 Report, Application No. GB 9908310.7 (Patent No. GB 2339363), dated Aug. 26, 2003.
United Kingdom Patent Office, Examination Report, Application No. GB 9908310.7 (Patent No. GB 2339363), dated Sep. 23, 2003.
Applicant, Response to United Kingdom Patent Office Sep. 23, 2003 Report, Application No. GB 9908310.7 (Patent No. GB 2339363), dated Nov. 17, 2003.
United Kingdom Patent Office, Examination Report, Application No. GB 9908310.7 (Patent No. GB 2339363), dated Dec. 16, 2003.
Applicant, Response to United Kingdom Patent Office Dec. 16, 2003 Report, Application No. GB 9908310.7 (Patent No. GB 2339363), dated Dec. 30, 2003.
United States Patent and Trademark Office, Office Action Summary and Detailed Action, U.S. Appl. No. 09/572,819 (U.S. Pat. No. 6,307,921), dated Oct. 25, 2000.
Applicant, Response (to Oct. 25, 2000 Office Action) and Terminal Disclaimers, U.S. Appl. No. 09/572,819 (U.S. Pat. No. 6,307,921), dated Apr. 25, 2001.

(56) References Cited

OTHER PUBLICATIONS

United States Patent and Trademark Office, Notice of Allowability, U.S. Appl. No. 09/572,819 (U.S. Pat. No. 6,307,921), dated Jun. 4, 2001.
United States Patent and Trademark Office, Office Action Summary and Detailed Action, U.S. Appl. No. 08/481,856 (U.S. Pat. No. 5,809,425), dated Aug. 28, 1996.
Applicant, Amendment (Response to Aug. 18, 1996 Office Action), U.S. Appl. No. 08/481,856 (U.S. Pat. No. 5,809,425), dated Feb. 28, 1997.
United States Patent and Trademark Office, Office Action Summary and Detailed Action, U.S. Appl. No. 08/481,856 (U.S. Pat. No. 5,809,425), dated May 28, 1997.
Applicant, Amendment (Response to May 28, 1997 Office Action), U.S. Appl. No. 08/481,856 (U.S. Pat. No. 5,809,425), dated Nov. 26, 1997.
United States Patent and Trademark Office, Notice of Allowance and Statement of Reasons for Allowance, U.S. Appl. No. 08/481,856 (U.S. Pat. No. 5,809,425), dated Dec. 23, 1997.
PCT International Search Report, Application No. PCT/US96/09492, dated Sep. 4, 1996.
United States Patent and Trademark Office, Office Action Summary and Detailed Action, U.S. Appl. No. 08/367,563, dateded Aug. 2, 1996.
United States Patent and Trademark Office, Office Action Summary and Detailed Action, U.S. Appl. No. 09/153,771, dated Aug. 3, 1999.
United States Patent and Trademark Office, Office Action Summary and Detailed Action, U.S. Appl. No. 11/955,476, dated Jan. 24, 2011.
Applicant, Amendment (Response to Jan. 24, 2011 Office Action) and Terminal Disclaimers, U.S. Appl. No. 11/955,476, dated May 23, 2011.
United States Patent and Trademark Office, Office Action Summary and Detailed Action, U.S. Appl. No. 11/955,476, dated Jun. 23, 2011.
Canadian Intellectual Property Office, Examiner's Report, Application No. CA 2,458,372, dated May 16, 2011.
Intellectual Property Philippines, Official Action, Application No. PH 12007502940, dated Jun. 6, 2011.
Applicant, Response to Jun. 6, 2011 Office Action, Application No. PH 12007502940, dated Aug. 4, 2011.
UK Intellectual Property Office, Examination Report, Application No. GB 0617585.5, dated Aug. 15, 2008.
UK Intellectual Property Office, Examination Report, Application No. GB 0617585.5, dated Dec. 17, 2008.
Applicant, Response to Dec. 17, 2008 Official Letter, Application No. GB 0617585.5, dated Feb. 16, 2009.
European Patent Office, Communication, Application No. EP 04761001.9, dated Jun. 30, 2011.
Complaint for Patent Infringement, *Ultratec, Inc., et al. v. Sorenson Communications, Inc., et al.*, Civil Action No. 3:15-ov-00563-JDP, United States District Court, Western District of Wisconsin, Sep. 7, 2015.
Amended Complaint for Patent Infringement, *Ultratec, Inc., et al. v. Sorenson Communications, Inc., et al.*, Civil Action No. 3:15-cv-00563-JDP, United States District Court, Western District of Wisconsin, Nov. 12, 2015.
Defendants' Motion to Stay Pending Inter Partes Review, *Ultratec, Inc., et al. v. Sorenson Communications, Inc., et al.*, Civil Action No. 3:15-cv-00563-JDP, United States District Court, Western District of Wisconsin, Dec. 11, 2015.
Defendants' Answer to Plaintiffs' Amended Complaint for Patent Infringement and Counterclaims, *Ultratec, Inc., et al. v. Sorenson Communications, Inc., et al.*, Civil Action No. 3:15-cv-00563-JDP, United States District Court, Western District of Wisconsin, Dec. 11, 2015.
Plaintiffs' Response to Defendants' Motion to Stay Pending Inter Partes Review, *Ultratec, Inc., et al. v. Sorenson Communications,* *Inc., et al.*, Civil Action No. 3:15-cv-00563-JDP, United States District Court, Western District of Wisconsin, Dec. 18, 2015.
Order Granting Motion to Stay Pending Inter Partes Review, *Ultratec, Inc., et al. v. Sorenson Communications, Inc., et al.*, Civil Action No. 3:15-cv-00563-JDP, United States District Court, Western District of Wisconsin, Dec. 22, 2015.
Choi, et al., Employing Speech Recognition Through Common Telephone Equipment, IBM Technical Disclosure Bulletin, Dec. 1995, pp. 355-356.
Choi, et al., Splitting and Routing Audio Signals in Systems with Speech Recognition, IBM Technical Disclosure Bulletin, Dec. 1995, 38(12):503-504.
Cook, A First Course in Digital Electronics, Published by Prentice-Hall, Inc., 1999, pp. 692-693.
De Gennaro, et al., (Cellular) Telephone Steno Captioning Service, IBM Technical Disclosure Bulletin, Jul. 1992, pp. 346-349.
Goodrich, et al., Engineering Education for Students with Disabilities: Technology, Research and Support, In Frontiers in Education Conference, 1993, 23rd Annual Conference 'Engineering Education: Renewing America's Technology' Proceedings, IEEE, pp. 92-97.
Gopalakrishnan, et al., Effective Set-Up for Performing Phone Conversations by the Hearing Impaired, IBM Technical Disclosure Bulletin, Dec. 1991, 34(7B):423-426.
IBM, Software Verification of Microcode Transfer Using Cyclic Redundancy Code Algorithm, IBM Technical Disclosure Bulletin, Dec. 1988, 31(7):149-153.
IBM, Use of Cyclic Redundancy Code for Testing ROM and RAM in a Writeable Control Store, IBM Technical Disclosure Bulletin, Nov. 1990, 33(6A):219-220.
Karjalainen, et al., Applications for the Hearing-Impaired: Evaluation of Finnish Phoneme Recognition Methods, Eurospeech, 1997, 4 pages.
Kitai, et al., Trends of ASR and Its Applications in Japan, Third IEEE Workshop on Interactive Voice Technology for Telecommunications Applications, 1996, pp. 21-24.
Kukich, Spelling Correction for the Telecommunications Network for the Deaf, Communications of the ACM, 1992, 35(5):80-90.
Makhoul, et al., State of the Art in Continuous Speech Recognition, Proc. Natl. Acad. Sci. USA, 1995, 92:9956-9963.
Microchip Technology, Inc., MCRF250, Contactless Programmable Passive RFID Device With Anti-Collision, 1998, DS21267C, pp. 1-12.
Oberteuffer, Commercial Applications of Speech Interface Technology: An Industry at the Threshold, Proc. Natl. Acad. Sci. USA, 1995, 92:10007-10010.
Osman-Allu, Telecommunication Interfaces for Deaf People, IEE Colloquium on Special Needs and the Interface, IET, 1993, pp. 811-814.
Paul, et al., The Design for the Wall Street Journal-based CSR Corpus, Proceedings of the Workshop on Speech and Natural Language, Association for Computational Linguistics, 1992, pp. 357-362.
Rabiner, et al., Fundamentals of Speech Recognition, Copyright 1993 by AT&T, Published by Prentice Hall PTR, pp. 1, 6-9, 284-285, 482-488.
Rabiner, Applications of Speech Recognition in the Area of Telecommunications, IEEE Workshop on Automatic Speech Recognition and Understanding, IEEE, 1997, pp. 501-510.
Schmitt, et al., An Experimental Study of Synthesized Speech Intelligibility Using Text Created by Telecommunication Device for the Deaf (TDD) Users, IEEE Global Telecommunications Conference & Exhibition, 1990, pp. 996-999.
Scott, Understanding Cyclic Redundancy Check, ACI Technical Support, Technical Note 99-11, 1999, 13 pages.
Seltzer, et al., Expediting the Turnaround of Radiology Reports in a Teaching Hospital Setting, AJR, 1997, 168:889-893.
Wactlar, et al., Informedia(TM): News-On-Demand Experiments in Speech Recognition, Proceedings of ARPA Speech Recognition Workshop, 1996, pp. 18-21.

(56) References Cited

OTHER PUBLICATIONS

Wegmann, Final Technical Report on Phase I SBIR Study on "Semi-Automated Speech Transcription System" at Dragon Systems, Advanced Research Projects Agency Order No. 5916, 1994, 21 pages.
Williams, A Painless Guide to CRC Error Detection Algorithms, 1993, 35 pages.
Yamamoto, et al., Special Session (New Developments in Voice Recognition) (Invited Presentation), New Applications of Voice Recognition, Proceedings of the Acoustical Society of Japan, Spring 1996 Research Presentation Conference, pp. 33-36.
Young, A Review of Large-Vocabulary Continuous-Speech Recognition, IEEE Signal Processing Magazine, 1996, pp. 45-57.
Cyclic Redundancy Check, Source: http://utopia.knoware.nl/users/eprebel/Communication/CRC/index.html, 1998, 4 pages.
U.S. Patent and Trademark Office, U.S. Appl. No. 08/396,554, Telephone for the Deaf and Method of Using Same, filed Mar. 1, 1995, 121 pages.
U.S. Patent and Trademark Office, U.S. Appl. No. 09/599,347, filed Jun. 22, 2000, 19 pages.
U.S. Patent and Trademark Office, U.S. Appl. No. 10/099,824, Graphic User Interface for a Patient Ventilator, filed Mar. 15, 2002, 3 pages.
U.S. Patent and Trademark Office, U.S. Appl. No. 60/041,458, TTY Modem System, filed Mar. 25, 1997, 32 pages.
The Patent Office, Examination Report, dated Apr. 15, 2002, Application No. GB 9908312.3, 2 pages.
Applicant, Response to Apr. 15, 2002 Examination Report, dated Oct. 14, 2002, Application No. GB 9908312.3, 2 pages.
CaptionCall L.L.C. Petition for Inter Partes Review of Claims 1 and 2 of U.S. Pat. No. 7,555,104 Under 35 U.S.C. 311-319 and 37 C.F.R. 42.100 Et Seq., Aug. 30, 2013, 65 pages.
CaptionCall L.L.C. Petition for Inter Partes Review of Claims 1 and 2 of U.S. Pat. No. 6,233,314 Under 35 U.S.C. 311-319 and 37 C.F.R. 42.100 Et Seq., Aug. 30, 2013, 39 pages.
CaptionCall L.L.C. Petition for Inter Partes Review of Claims 1 and 2 of U.S. Pat. No. 6,594,346 Under 35 U.S.C. 311-319 and 37 C.F.R. 42.100 Et Seq., Aug. 30, 2013, 67 pages.
CaptionCall L.L.C. Petition for Inter Partes Review of Claims 1-15 of U.S. Pat. No. 5,909,482 Under 35 U.S.C. 311-319 and 37 C.F.R. 42.100 Et Seq., Aug. 30, 2013, 67 pages.
CaptionCall L.L.C. Petition for Inter Partes Review of Claims 7-11 of U.S. Pat. No. 8,213,578 Under 35 U.S.C. 311-319 and 37 C.F.R. 42.100 Et Seq., Aug. 30, 2013, 67 pages.
CaptionCall L.L.C. Petition for Inter Partes Review of Claims 1-8 of U.S. Pat. No. 6,603,835 Under 35 U.S.C. 311-319 and 37 C.F.R. 42.100 Et Seq., Aug. 30, 2013, 66 pages.
CaptionCall L.L.C. Petition for Inter Partes Review of Claims 1 of U.S. Pat. No. 7,003,082 Under 35 U.S.C. 311-319 and 37 C.F.R. 42.100 Et Seq., Aug. 30, 2013, 51 pages.
CaptionCall L.L.C. Petition for Inter Partes Review of Claims 1 and 2 of U.S. Pat. No. 7,319,740 Under 35 U.S.C. 311-319 and 37 C.F.R. 42.100 Et Seq., Aug. 30, 2013, 67 pages.
United States Patent and Trademark Office Before the Patent Trial and Appeal Board, Decision—Institution of Inter Partes Review, *CaptionCall LLC v. Ultratec Inc.*, Case IPR2013-00550, U.S. Pat. No. 7,003,082 B2, Mar. 5, 2014, 13 pages.
United States Patent and Trademark Office Before the Patent Trial and Appeal Board, Decision—Institution of Inter Partes Review, *CaptionCall LLC v. Ultratec Inc.*, Case IPR2013-00543, U.S. Pat. No. 7,555,104, Mar. 5, 2014, 16 pages.
United States Patent and Trademark Office Before the Patent Trial and Appeal Board, Decision—Institution of Inter Partes Review, *CaptionCall LLC v. Ultratec Inc.*, Case IPR2013-00540, U.S. Pat. No. 6,233,314, Mar. 5, 2014, 17 pages.
United States Patent and Trademark Office Before the Patent Trial and Appeal Board, Decision—Institution of Inter Partes Review, *CaptionCall LLC v. Ultratec Inc.*, Case IPR2013-00545, U.S. Pat. No. 6,594,346, Mar. 5, 2014, 21 pages.
United States Patent and Trademark Office Before the Patent Trial and Appeal Board, Decision—Institution of Inter Partes Review, *CaptionCall LLC v. Ultratec Inc.*, Case IPR2013-00541, U.S. Pat. No. 5,909,482, Mar. 5, 2014, 32 pages.
United States Patent and Trademark Office Before the Patent Trial and Appeal Board, Decision—Institution of Inter Partes Review, *CaptionCall LLC v. Ultratec Inc.*, Case IPR2013-00544, U.S. Pat. No. 8,213,578, Mar. 5, 2014, 22 pages.
United States Patent and Trademark Office Before the Patent Trial and Appeal Board, Decision—Institution of Inter Partes Review, *CaptionCall LLC v. Ultratec Inc.*, Case IPR2013-00542, U.S. Pat. No. 7,319,740, Mar. 5, 2014, 17 pages.
United States Patent and Trademark Office Before the Patent Trial and Appeal Board, Decision—Institution of Inter Partes Review, *CaptionCall LLC v. Ultratec Inc.*, Case IPR2013-00549, U.S. Pat. No. 6,603,835 B2, Mar. 5, 2014, 26 pages.
Ultratec Inc. and Captel Inc., Complaint for Patent Infringement, *Ultratec Inc.* and *CapTel Inc. v. Sorenson Communications Inc.* and *CaptionCall LLC*, Civil Action No. 13-346, May 17, 2013, 13 pages.
Complaint for Patent Infringement, *Ultratec, Inc., et al. v. Sorenson Communications, Inc., et al.*, Civil Action No. 3:14-cv-00847-BBC, United States District Court, Western District of Wisconsin, Dec. 8, 2014.
Amended Complaint for Patent Infringement, *Ultratec, Inc., et al. v. Sorenson Communications, Inc., et al.*, Civil Action No. 3:14-cv-00847-BBC, United States District Court, Western District of Wisconsin, Dec. 22, 2014.
Defendants' Answer to Plaintiffs' Amended Complaint for Patent Infringement and Counterclaims, *Ultratec, Inc., et al. v. Sorenson Communications, Inc., et al.*, Civil Action No. 3:14-cv-00847-BBC, United States District Court, Western District of Wisconsin, Jan. 30, 2015.
Plaintiffs' Answer to Defendants Counterclaims, *Ultratec, Inc., et al. v. Sorenson Communications, Inc., et al.*, Civil Action No. 3:14-cv-00847-BBC, United States District Court, Western District of Wisconsin, Feb. 20, 2015.
Defendants' First Amended Answer to Plaintiffs' Amended Complaint for Patent Infringement and Counterclaims, *Ultratec, Inc., et al. v. Sorenson Communications, Inc., et al.*, Civil Action No. 3:14-cv-00847-BBC, United States District Court, Western District of Wisconsin, Feb. 20, 2015.
Defendants' Motion to Stay Pending Inter Partes Review, *Ultratec, Inc., et al. v. Sorenson Communications, Inc., et al.*, Civil Action No. 3:14-cv-00847-BBC, United States District Court, Western District of Wisconsin, Apr. 7, 2015.
Parties' Stipulation to a Temporary Stay, *Ultratec, Inc., et al. v. Sorenson Communications, Inc., et al.*, Civil Action No. 3:14-cv-00847-BBC, United States District Court, Western District of Wisconsin, Apr. 24, 2015.
Order Granting Defendants' Motion to Stay Pending Inter Partes Review, *Ultratec, Inc., et al. v. Sorenson Communications, Inc., et al.*, Civil Action No. 3:14-cv-00847-BBC, United States District Court, Western District of Wisconsin, Apr. 30, 2015.
Joint Notice of IPR Institution and Stipulation to Continue the Stay, *Ultratec, Inc., et al. v. Sorenson Communications, Inc., et al.*, Civil Action No. 3:14-cv-00847-BBC, United States District Court, Western District of Wisconsin, Sep. 11, 2015.
Applicant, First Amendment (in Response to United States Patent and Trademark Office Nov. 8, 2012 Office Action), U.S. Appl. No. 12/686,688, dated Feb. 7, 2013.
CaptionCall L.L.C. Petition for Inter Paries Review of Claims 6 and 8 of U.S. Pat. No. 6,603,835 Under 35 U.S.C. 311-319 and 37 C.F.R. 42.100 Et Seq., May 19, 2014, 67 Pages.
Canadian Intellectual Property Office, Examiner's Report, Application No. CA 2,613,363, dated Oct. 1, 2012.
Applicant, Response to Examiner's Report, Application No. CA 2,613,363, dated Mar. 7, 2013.
Canadian Intellectual Property Office, Notice of Allowance, Application No. CA 2,613,363, dated Oct. 18, 2013.
Government of India Patent Office, First Examination Report, Application No. IN 4970/KOLNP/2007, dated Feb. 26, 2014.

(56) References Cited

OTHER PUBLICATIONS

Canadian Intellectual Property Office, Examiner's Report, Application No. CA 2,556,933, dated Apr. 10, 2012.
Applicant, Response to Official Action, Application No. C 2,556,933, dated Jul. 12, 2012.
Canadian Intellectual Property Office, Notice of Allowance, Application No. CA 2,556,933, dated Feb. 14, 2013.
PCT International Search Report and Written Opinion, PCT/US2009/040523, dated Nov. 11, 2009.
Canadian Intellectual Property Office, Examiner's Report, Application No. CA 2,761,343, dated Mar. 8, 2012.
Applicant, Response to Official Action, Application No. CA 2,761,343, dated Mar. 30, 2012.
Canadian Intellectual Property Office, Notice of Allowance, Application No. CA 2,761,343, dated Jul. 24, 2012.
Applicant, Amendment Submitted with a Request for Continued Examination and Terminal Disclaimers, U.S. Appl. No. 11/955,476, dated Oct. 19, 2011.
United States Patent and Trademark Office, Notice of Allowance, U.S. Appl. No. 11/955,476, dated Mar. 2, 2012.
United States Patent and Trademark Office, Office Action Summary and Detailed Action, U.S. Appl. No. 13/486,221, dated Sep. 13, 2013.
Applicant, Amendment (Response to Sep. 13, 2013, Office Action), U.S. Appl. No. 13/486,221, dated Mar. 11, 2014.
United States Patent and Trademark Office, Office Action Summary and Detailed Action, U.S. Appl. No. 13/486,221, dated Mar. 26, 2014.
Applicant, Terminal Disclaimers and Remarks, U.S. Appl. No. 13/486,221, dated Apr. 30, 2014.
United States Patent and Trademark Office, Office Action Summary and Detailed Action, U.S. Appl. No. 13/486,221, dated Jun. 25, 2014.
United States Patent and Trademark Office, Office Action Summary and Detailed Action, U.S. Appl. No. 13/950,860, dated Jan. 9, 2014.
Applicant, Amendment (Response to Jan. 9, 2014, Office Action), U.S. Appl. No. 13/950,860, dated Jun. 30, 2014.
Declaration of Benedict J. Occhiogrosso, In Re: U.S. Pat. No. 7,003,082, United States Patent and Trademark Office Before the Patent Trial and Appeal Board, Aug. 30, 2013.
Declaration of Benedict J. Occhiogrosso, In Re: U.S. Pat. No. 6,603,835, United States Patent and Trademark Office Before the Patent Trial and Appeal Board, Aug. 30, 2013.
Declaration of Benedict J. Occhiogrosso, In Re: U.S. Pat. No. 6,233,314, United States Patent and Trademark Office Before the Patent Trial and Appeal Board, Aug. 30, 2013.
Declaration of Benedict J. Occhiogrosso, In Re: U.S. Pat. No. 5,909,482, United States Patent and Trademark Office Before the Patent Trial and Appeal Board, Aug. 30, 2013.
Declaration of Benedict J. Occhiogrosso, In Re: U.S. Pat. No. 7,319,740, United States Patent and Trademark Office Before the Patent Trial and Appeal Board, Aug. 30, 2013.
Declaration of Benedict J. Occhiogrosso, In Re: U.S. Pat. No. 6,594,346, United States Patent and Trademark Office Before the Patent Trial and Appeal Board, Aug. 30, 2013.
Declaration of Benedict J. Occhiogrosso, In Re: U.S. Pat. No. 7,555,104, United States Patent and Trademark Office Before the Patent Trial and Appeal Board, Aug. 30, 2013.
Declaration of Benedict J. Occhiogrosso, In Re: U.S. Pat. No. 8,213,578, United States Patent and Trademark Office Before the Patent Trial and Appeal Board, Aug. 30, 2013.
Request for Rehearing Under 37 C.F.R. 42.71(d), In Re: U.S. Pat. No. 6,603,835, Case IPR2013-00549, United States Patent and Trademark Office Before the Patent Trial and Appeal Board, Mar. 19, 2014.
Patent Owner Response Under 37 C.F.R. 42.120 (to the Institution of Inter Partes Review), In Re: U.S. Pat. No. 5,594,346, Case IPR2013-00545, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,003,082, Case IPR2013-00550, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,555,104, Case IPR2013-00543, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 7,319,740, Case IPR2013-00542, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 6,603,835, Case IPR2013-00549, In the United States Patent and Trademark Office Before the Patent Trial and Appeal Board, May 12, 2014.
Patent Owner Response Under 37 C.F.R. 42.120 (to the Institution of Inter Partes Review), In Re: U.S. Pat. No. 8,213,578, Case IPR2013-00544, In the United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 5,909,482, Case IPR2013-00541, In the United States Patent and Trademark Office Before the Patent Trial and Appeal Board, May 30, 2014.
Patent Owner Response Under 37 C.F.R. 42.120 (to the Institution of Inter Partes Review), In Re: U.S. Pat. No. 6,233,314, Case IPR2013-00540, In the United States Patent and Trademark Office Before the Patent Trial and Appeal Board, May 30, 2014.
Declaration of Brenda Battat, In Re: U.S. Pat. No. 8,231,578, Case IPR2013-00544, In the United States Patent and Trademark Office Before the Patent Trial and Appeal Board, May 8, 2014.
Declaration of Constance Phelps, In Re: U.S. Pat. No. 6,233,314, Case IPR2013-00540, In the United States Patent and Trademark Office Before the Patent Trial and Appeal Board, May 9, 2014.
Declaration of Benedict J. Occhiogrosso, In Re: U.S. Pat. No. 6,603,835, United States Patent and Trademark Office Before the Patent Trial and Appeal Board, May 19, 2014.
Declaration of James A. Steel, Jr., In Re: U.S. Pat. No. 7,319,740, Case IPR2013-00542, United States Patent and Trademark Office Before the Patent Trial and Appeal Board, May 10, 2014.
Declaration of James A. Steel, Jr., In Re: U.S. Pat. No. 7,003,082, Case IPR2013-00550, United States Patent and Trademark Office Before the Patent Trial and Appeal Board, May 10, 2014.
Declaration of James A. Steel, Jr., In Re: U.S. Pat. No. 6,603,835, Case IPR2013-00549, United States Patent and Trademark Office Before the Patent Trial and Appeal Board, May 11, 2014.
Declaration of James A. Steel, Jr., In Re: U.S. Pat. No. 7,555,104, Case IPR2013-00543, United States Patent and Trademark Office Before the Patent Trial and Appeal Board, May 12, 2014.
United States Patent and Trademark Office, Office Action Summary and Detailed Action, U.S. Appl. No. 09/783,679 (U.S. Pat. No. 6,594,346), dated Jun. 5, 2002.
Applicant, Response (to Jun. 5, 2002 Office Action), U.S. Appl. No. 09/783,679 (U.S. Pat. No. 6,594,346), dated Dec. 4, 2002.
United States Patent and Trademark Office, Notice of Allowance, U.S. Appl. No. 09/783,679 (U.S. Pat. No. 6,594,346), dated Feb. 19, 2003.
United States Patent and Trademark Office, Office Action Summary and Detailed Action, U.S. Appl. No. 09/789,120 (U.S. Pat. No. 6,567,503), dated Jun. 17, 2002.
Applicant, Amendment (Response to Jun. 17, 2002 Office Action), U.S. Appl. No. 09/789,120 (U.S. Pat. No. 6,567,503), dated Oct. 19, 2002.
United States Patent and Trademark Office, Notice of Allowance, U.S. Appl. No. 09/789,120 (U.S. Pat. No. 5,567,503), dated Dec. 30, 2002.
Canadian Intellectual Property Office, Examiner's Report, Application No. CA 2,372,061, dated Apr. 26, 2004.
Applicant, Response to Apr. 26, 2004 Official Action, Application No. CA 2,372,061, dated Oct. 26, 2004.
Canadian Intellectual Property Office, Notice of Allowance, Application No. CA 2,372,061, dated May 26, 2005.

(56) References Cited

OTHER PUBLICATIONS

Canadian Intellectual Property Office, Examiner's Report, Application No. CA 2,520,594, dated Mar. 7, 2006.
Applicant, Response to Mar. 7, 2006 Office Action, Application No. CA 2,520,594, dated Sep. 6, 2006.
Canadian Intellectual Property Office, Examiner's Report, Application No. CA 2,520,594, dated Nov. 27, 2006.
Applicant, Response to Nov. 27, 2006 Office Action, Application No. CA 2,520,594, dated May 25, 2007.
United Kingdom Patent Office, Combined Search and Examination Report, Application No. GB 0203898.2, dated Aug. 30, 2002.
Applicant, Response to Aug. 30, 2002 Official Letter, Application No. GB 0203898.2, dated Oct. 28, 2002.
United Kingdom Patent Office, Examination Report, Application No. GB 0203898.2, dated Jan. 21, 2003.
Applicant, Response to Jan. 21, 2003 Official Letter, Application No. GB 0203898.2, dated Jul. 15, 2003.
United Kingdom Patent Office, Combined Search and Examination Report, Application No. GB 0225275.7, dated Jan. 20, 2003.
Applicant, Response to Jan. 20, 2003 Letter, Application No. GB 0225275.7, dated Jul. 14, 2003.
United States Patent and Trademark Office, Office Action Summary and Detailed Action, U.S. Appl. No. 09/790,413 (U.S. Pat. No. 6,882,707), dated Mar. 23, 2004.
Applicant, Response to Restriction Requirement, U.S. Appl. No. 09/790,413 (U.S. Pat. No. 6,882,707), dated Apr. 9, 2004.
United States Patent and Trademark Office, Office Action Summary and Detailed Action, U.S. Appl. No. 09/790,413 (U.S. Pat. No. 6,882,707), dated May 7, 2004.
Applicant, Response to May 7, 2004 Office Action, U.S. Appl. No. 09/790,413 (U.S. Pat. No. 6,882,707), dated Aug. 9, 2004.
United States Patent and Trademark Office, Notice of Allowance, Examiner's Amendment and Interview Summary, U.S. Appl. No. 09/790,413 (U.S. Pat. No. 6,882,707), dated Dec. 10, 2004.
United States Patent and Trademark Office, Office Action Summary and Detailed Action, U.S. Appl. No. 10/336,950, dated Jun. 2, 2003.
United States Patent and Trademark Office, Office Action Summary and Detailed Action, U.S. Appl. No. 11/391,141 (U.S. Pat. No. 7,881,441), dated Mar. 9, 2010.
Applicant, First Amendment, U.S. Appl. No. 11/391,141 (U.S. Pat. No. 7,881,441), dated Jun. 9, 2010.
United States Patent and Trademark Office, Notice of Allowance, U.S. Appl. No. 11/391,141 (U.S. Pat. No. 7,881,441), dated Sep. 21, 2010.
United States Patent and Trademark Office, Supplemental Notice of Allowability, U.S. Appl. No. 11/391,141 (U.S. Pat. No. 7,881,441), dated Dec. 7, 2010.
European Patent Office, Communication, Application No. EP 06785768.0, dated Feb. 7, 2008.
Applicant, Reply to Feb. 7, 2008 Communication, Application No. EP 06785768.0, dated Mar. 12, 2008.
European Patent Office, Examination Report, Application No. EP 06785768.0, dated Aug. 9, 2010.
Applicant, Response to Aug. 9, 2010 Communication, Application No. EP 06785768.0, dated Dec. 20, 2010.
PCT International Search Report and Written Opinion, Application No. PCT/US2006/025236, dated Oct. 2, 2006.
PCT International Preliminary Report on Patentability, Application No. PCT/US2006/025236, dated Jan. 9, 2008.
Republic of the Philippines Intellectual Property Office, Findings/Action of Examiner, Application No. PH 1-2007-502940, dated Oct. 29, 2010.
Applicant, Response to Oct. 29, 2010 Office Action, Application No. PH 1-2007-502940, dated Dec. 29, 2010.
IP Australia, Examiner's First Report, Application No. AU 2006263680, dated Jun. 29, 2009.
Applicant, Response to Jun. 29, 2009 Examination Report, Application No. AU 2006263680, dated Jun. 17, 2010.
IP Australia, Examiner's Report No. 2, Application No. AU 2006263680, dated Jun. 22, 2010.

Applicant, Response to Jun. 22, 2010 Examination Report, Application No. AU 2006263680, dated Jul. 16, 2010.
United States Patent and Trademark Office, Office Action Summary and Detailed Action, U.S. Appl. No. 11/361,114 (U.S. Pat. No. 7,555,104), dated May 21, 2007.
Applicant, Terminal Disclaimer, U.S. Appl. No. 11/361,114 (U.S. Pat. No. 7,555,104), filed Jul. 23, 2007.
United States Patent and Trademark Office, Notice of Allowance and Examiner's Statement of Reasons for Allowance, U.S. Appl. No. 11/361,114 (U.S. Pat. No. 7,555,104), dated Sep. 15, 2008.
Applicant, Request for Continued Examination and Submission of Supplemental Information Disclosure Statement, U.S. Appl. No. 11/361,114 (U.S. Pat. No. 7,555,104), dated Dec. 15, 2008.
United States Patent and Trademark Office, Notice of Allowance, U.S. Appl. No. 11/361,114 (U.S. Pat. No. 7,555,104), dated Feb. 25, 2009.
United States Patent and Trademark Office, Notice of Allowance and Examiner's Statement of Reasons for Allowance, U.S. Appl. No. 09/876,340 (U.S. Pat. No. 6,504,910), dated Aug. 13, 2002.
PCT International Search Report, Application No. PCT/US02/18156, dated Oct. 29, 2002.
CaptionCall L.L.C. Petition for Inter Partes Review of Claims 1-30 of U.S. Pat. No. 8,908,838 Under 35 U.S.C. 311-319 and 37 C.F.R. 42 100 Et Seq., Jan. 29, 2015, 67 pages.
Declaration of Benedict J. Occhiogrosso, In Re: U.S. Pat. No. 8,908,838, Case IPR2015-00637, In the United States Patent and Trademark Office Before the Patent Trial and Appeal Board, Jan. 28, 2015, 62 pages.
CaptionCall L.L.C. Petition for Inter Partes Review of Claims 1-29 of U.S. Pat. No. 8,917,822 Under 35 U.S.C. 311-319 and 37 C.F.R. 42 100 Et Seq., Jan. 29, 2015, 67 pages.
Declaration of Benedict J. Occhiogrosso, In Re: U.S. Pat. No. 8,917,822, Case IPR2015-00636, In the United States Patent and Trademark Office Before the Patent Trial and Appeal Board, Jan. 28, 2015, 65 pages.
In the United States Patent and Trademark Office Before the Patent Trial and Appeal Soard, Decision—Institution of Inter Partes Review, *CaptionCall LLC* v. *Ultratec Inc.*, Case IPR2014-00780, U.S. Pat. No. 6,603,835, Dec. 4, 2014, 14 pages.
In the United States Patent and Trademark Office Before the Patent Trial and Appeal Soard, Patent Owner Response Under 37 C.F.R. 42.120, *CaptionCall LLC* v. *Ultratec Inc.*, Case IPR2014-00780, U.S. Pat. No. 6,603,835, Feb. 11, 2015, 68 pages.
Ultratec Inc. and Captel Inc., Amended Complaint for Patent Infringement, *Ultratec, Inc., et al.* v. *Sorenson Communications, Inc., et al.*, Civil Action No. 3:14-cv-847-JDP, United States District Court, Western District of Wisconsin, Dec. 23, 2014, 15 pages.
Sorenson Communications Inc. and Captioncall LLC, Defendants' First Amended Answer to Plaintiffs' Amended Complaint for Patent Infringement and Counterclaims, Civil Action No. 3:14-cv-847-JDP, United States District Court, Western District of Wisconsin, Feb. 20, 2015, 41 pages.
In the United States Patent and Trademark Office Before the Patent Trial and Appeal Board, Final Written Decision, *CaptionCall LLC* v. *Ultratec Inc.*, Case IPR2014-00540, U.S. Pat. No. 6,233,314, Mar. 3, 2015, 55 pages.
In the United States Patent and Trademark Office Before the Patent Trial and Appeal Board, Final Written Decision, *CaptionCall LLC* v. *Ultratec Inc.*, Case IPR2014-00541, U.S. Pat. No. 5,909,482, Mar. 3, 2015, 77 pages.
In the United States Patent and Trademark Office Before the Patent Trial and Appeal Board, Final Written Decision, *CaptionCall LLC* v. *Ultratec Inc.*, Case IPR2014-00542, U.S. Pat. No. 7,319,740, Mar. 3, 2015, 31 pages.
In the United States Patent and Trademark Office Before the Patent Trial and Appeal Board, Final Written Decision, *CaptionCall LLC* v. *Ultratec Inc.*, Case IPR2014-00543, U.S. Pat. No. 7,555,104, Mar. 3, 2015, 29 pages.
In the United States Patent and Trademark Office Before the Patent Trial and Appeal Board, Final Written Decision, *CaptionCall LLC* v. *Ultratec Inc.*, Case IPR2014-00544, U.S. Pat. No. 8,213,578, Mar. 3, 2015, 56 pages.

(56) References Cited

OTHER PUBLICATIONS

In the United States Patent and Trademark Office Before the Patent Trial and Appeal Board, Final Written Decision, *CaptionCall LLC v. Ultratec Inc.*, Case IPR2014-00545, U.S. Pat. No. 6,594,346, Mar. 3, 2015, 41 pages.
In the United States Patent and Trademark Office Before the Patent Trial and Appeal Board, Final Written Decision, *CaptionCall LLC v. Ultratec Inc.*, Case IPR2014-00549, U.S. Pat. No. 6,603,835, Mar. 3, 2015, 35 pages.
In the United States Patent and Trademark Office Before the Patent Trial and Appeal Board, Final Written Decision, *CaptionCall LLC v. Ultratec Inc.*, Case IPR2014-00550, U.S. Pat. No. 7,003,082, Mar. 3, 2015, 25 pages.
Extended European Search Report for application 16150223.2, European Patent Office, dated Apr. 11, 2016, 8 pages.
Petition for Inter Partes Review for U.S. Pat. No. 9,961,196, *CaptionCall LLC v. Ultratec Inc.*, United States Patent and Trademark Office, Nov. 12, 2018, 76 pages.
Declaration of Benedict J. Occhiogrosso for U.S. Pat. No. 9,961,196, *CaptionCall LLC v. Ultratec Inc.*, United States Patent and Trademark Office, Nov. 12, 2018, 112 pages.
Petition for Inter Partes Review for U.S. Pat. No. 9,967,380, *CaptionCall LLC v. Ultratec Inc.*, United States Patent and Trademark Office, Nov. 12, 2018, 77 pages.
Declaration of Benedict J. Occhiogrosso for U.S. Pat. No. 9,967,380, *CaptionCall LLC v. Ultratec Inc.*, United States Patent and Trademark Office, Nov. 12, 2018, 148 pages.
In the United States Patent and Trademark Office Before the Patent Trial and Appeal Board, Petitioner's Reply to Patent Owner's Response, *CaptionCall LLC v. Ultratec Inc.*, Case IPR2014-00780, U.S. Pat. No. 6,603,835, Apr. 20, 2015, 30 pages.
In the United States Patent and Trademark Office Before the Patent Trial and Appeal Board, Final Written Decision, *CaptionCall LLC v. Ultratec Inc.*, Case IPR2014-00780, U.S. Pat. No. 6,603,835, Dec. 1, 2015, 56 pages.
In the United States Patent and Trademark Office Before the Patent Trial and Appeal Board, Patent Owner's Request for Rehearing by Expanded Panel, *CaptionCall LLC v. Ultratec Inc.*, Case PR2014-00780, U.S. Pat. No. 6,603,835, Dec. 31, 2015, 20 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00540, U.S. Pat. No. 6,233,314, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00540, U.S. Pat. No. 6,233,314, Dec. 1, 2015, 18 pages.
In the United States Patent and Trademark Office Before the Patent Trial and Appeal Board, Patent Owner's Notice of Appeal, *CaptionCall LLC v. Ultratec Inc.*, Case IPR2013-00540, U.S. Pat. No. 6,233,314, Feb. 2, 2016, 19 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00541, U.S. Pat. No. 5,909,482, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00541, U.S. Pat. No. 5,909,482, Dec. 1, 2015, 18 pages.
In the United States Patent and Trademark Office Before the Patent Trial and Appeal Board, Patent Owner's Notice of Appeal, *CaptionCall LLC v. Ultratec Inc.*, Case IPR2013-00541, U.S. Pat. No. 5,909,482, Feb. 2, 2016, 19 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00542, U.S. Pat. No. 7,319,470, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00542, U.S. Pat. No. 7,319,470, Dec. 1, 2015, 15 pages.
In the United States Patent and Trademark Office Before the Patent Trial and Appeal Board, Patent Owner's Notice of Appeal, *CaptionCall LLC v. Ultratec Inc.*, Case IPR2013-00542, U.S. Pat. No. 7,319,470, Feb. 2, 2016, 12 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00543, U.S. Pat. No. 7,555,104, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00543, U.S. Pat. No. 7,555,104, Dec. 1, 2015, 15 pages.
In the United States Patent and Trademark Office Before the Patent Trial and Appeal Board, Patent Owner's Notice of Appeal, *CaptionCall LLC v. Ultratec Inc.*, Case IPR2013-00543, U.S. Pat. No. 7,555,104, Feb. 2, 2016, 11 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00544, U.S. Pat. No. 8,213,578, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00544, U.S. Pat. No. 8,213,578, Dec. 1, 2015, 19 pages.
In the United States Patent and Trademark Office Before the Patent Trial and Appeal Board, Patent Owner's Notice of Appeal, *CaptionCall LLC v. Ultratec Inc.*, Case IPR2013-00544, U.S. Pat. No. 8,213,578, Feb. 2, 2016, 11 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00545, U.S. Pat. No. 6,594,346, Apr. 2, 2015, 16 pages.
In the United States Patent and Trademark Office Before the Patent Trial and Appeal Board, Decision Denying Patent Owner's Request for Rehearing, *CaptionCall LLC v. Ultratec Inc.*, Case PR2013-00545, U.S. Pat. No. 6,594,346, Dec. 1, 2015, 15 pages.
In the United States Patent and Trademark Office Before the Patent Trial and Appeal Board, Patent Owner's Notice of Appeal, *CaptionCall LLC v. Ultratec Inc.*, Case IPR2013-00545, U.S. Pat. No. 6,594,346, Feb. 2, 2016, 11 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00549, U.S. Pat. No. 6,603,835, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00549, U.S. Pat. No. 6,603,835, Dec. 1, 2015, 15 pages.
In the United States Patent and Trademark Office Before the Patent Trial and Appeal Board, Patent Owner's Notice of Appeal, *CaptionCall LLC v. Ultratec Inc.*, Case IPR2013-00549, U.S. Pat. No. 6,603,835, Feb. 2, 2016, 11 pages.
In the United States Patent and Trademark Office Before the Patent Trial and Appeal Board, Patent Owner's Request for Rehearing by Expanded Panel, *CaptionCall LLC v. Ultratec Inc.*, Case PR2013-00550, U.S. Pat. No. 7,003,082, Apr. 2, 2015, 19 pages.
In the United States Patent and Trademark Office Before the Patent Trial and Appeal Board, Decision Denying Patent Owner's Request for Rehearing, *CaptionCall LLC v. Ultratec Inc.*, Case PR2013-00550, U.S. Pat. No. 7,003,082, Dec. 1, 2015, 10 pages.
In the United States Patent and Trademark Office Before the Patent Trial and Appeal Board, Patent Owner's Notice of Appeal, *CaptionCall LLC v. Ultratec Inc.*, Case IPR2013-00550, U.S. Pat. No. 7,003,082, Feb. 2, 2016, 11 pages.
In the United States Patent and Trademark Office Before the Patent Trial and Appeal Board, Decision Denying Institution of Inter Partes Review, *CaptionCall LLC v. Ultratec Inc.*, Case IPR2014-01287, U.S. Pat. No. 7,660,398, Feb. 12, 2015, 15 pages.

(56) References Cited

OTHER PUBLICATIONS

In the United States Patent and Trademark Office Before the Patent Trial and Appeal Board, Request for Rehearing, *CaptionCall LLC v. Ultratec Inc.,* Case IPR2014-01287, U.S. Pat. No. 7,660,398, Mar. 13, 2015, 18 pages.
In the United States Patent and Trademark Office Before the Patent Trial and Appeal Board, Decision Denying Request for Rehearing, *CaptionCall LLC v. Ultratec Inc.,* Case IPR2014-01287, U.S. Pat. No. 7,660,398, Nov. 5, 2015, 7 pages.
In the United States Patent and Trademark Office Before the Patent Trial and Appeal Board, Petition for Inter Partes Review of Claims 1-18 of U.S. Pat. No. 5,974,116, *CaptionCall LLC v. Ultratec Inc.,* Case IPR2015-01355, U.S. Pat. No. 5,974,116, Jun. 8, 2015, 65 pages.
In the United States Patent and Trademark Office Before the Patent Trial and Appeal Board, Patent Owner's Preliminary Response, *CaptionCall LLC v. Ultratec Inc.,* Case IPR2015-01355, U.S. Pat. No. 5,974,116, Sep. 18, 2015, 43 pages.
In the United States Patent and Trademark Office Before the Patent Trial and Appeal Board, Decision Instituting Review, *CaptionCall LLC v. Ultratec Inc.,* Case IPR2015-01355, U.S. Pat. No. 5,974,116, Dec. 16, 2015, 34 pages.
Declaration of Benedict J. Occhiogrosso, In Re: U.S. Pat. No. 5,974,116, Case IPR2015-001355, In the United States Patent and Trademark Office Before the Patent Trial and Appeal Board, Jun. 8, 2015, 45 pages.
In the United States Patent and Trademark Office Before the Patent Trial and Appeal Board, Petition for Inter Partes Review of Claim 1 of U.S. Pat. No. 6,934,366, *CaptionCall LLC v. Ultratec Inc.,* Case IPR2015-01357, U.S. Pat. No. 6,934,366, Jun. 8, 2015, 65 pages.
In the United States Patent and Trademark Office Before the Patent Trial and Appeal Board, Patent Owner's Preliminary Response, *CaptionCall LLC v. Ultratec Inc.,* Case IPR2015-01357, U.S. Pat. No. 6,934,366, Sep. 22, 2015, 37 pages.
In the United States Patent and Trademark Office Before the Patent Trial and Appeal Board, Decision Instituting Review, *CaptionCall LLC v. Ultratec Inc.,* Case IPR2015-01357, U.S. Pat. No. 6,934,366, Dec. 18, 2015, 16 pages.
Declaration of Benedict J. Occhiogrosso, In Re: U.S. Pat. No. 6,934,366, Case IPR2015-001357, In the United States Patent and Trademark Office Before the Patent Trial and Appeal Board, Jun. 8, 2015, 46 pages.
In the United States Patent and Trademark Office Before the Patent Trial and Appeal Board, Petition for Inter Partes Review of Claim 1 of U.S. Pat. No. 7,006,604, *CaptionCall LLC v. Ultratec Inc.,* Case IPR2015-01358, U.S. Pat. No. 7,006,604, Jun. 8, 2015, 65 pages.
In the United States Patent and Trademark Office Before the Patent Trial and Appeal Board, Patent Owner's Preliminary Response, *CaptionCall LLC v. Ultratec Inc.,* Case IPR2015-01358, U.S. Pat. No. 7,006,604, Sep. 22, 2015, 34 pages.
In the United States Patent and Trademark Office Before the Patent Trial and Appeal Board, Decision Instituting Review, *CaptionCall LLC v. Ultratec Inc.,* Case IPR2015-01358, U.S. Pat. No. 7,006,604, Dec. 18, 2015, 12 pages.
Declaration of Benedict J. Occhiogrosso, In Re: U.S. Pat. No. 7,006,604, Case IPR2015-001358, In the United States Patent and Trademark Office Before the Patent Trial and Appeal Board, Jun. 8, 2015, 45 pages.
In the United States Patent and Trademark Office Before the Patent Trial and Appeal Soard, Petition for Inter Partes Review of Claims 1-3 and 5-7 of U.S. Pat. No. 6,493,426, *CaptionCall LLC v. Ultratec Inc.,* Case IPR2015-01359, U.S. Pat. No. 6,493,426, Jun. 8, 2015, 65 pages.
In the United States Patent and Trademark Office Before the Patent Trial and Appeal Soard, Patent Owner's Preliminary Response, *CaptionCall LLC v. Ultratec Inc.,* Case IPR2015-01359, U.S. Pat. No. 6,493,426, Sep. 22, 2015, 40 pages.
In the United States Patent and Trademark Office Before the Patent Trial and Appeal Soard, Decision Instituting Review, *CaptionCall LLC v. Ultratec Inc.,* Case IPR2015-01359, U.S. Pat. No. 6,493,426, Dec. 18, 2015, 17 pages.
Declaration of Benedict J. Occhiogrosso, In Re: U.S. Pat. No. 6,493,426, Case IPR2015-001359, In the United States Patent and Trademark Office Before the Patent Trial and Appeal Board, Jun. 8, 2015, 47 pages.
In the United States Patent and Trademark Office Before the Patent Trial and Appeal Board, Petition for Inter Partes Review of Claims 1-4 of U.S. Pat. No. 8,515,024, *CaptionCall LLC v. Ultratec Inc.,* Case IPR2015-01885, U.S. Pat. No. 8,515,024, Sep. 8, 2015, 35 pages.
In the United States Patent and Trademark Office Before the Patent Trial and Appeal Soard, Patent Owner's Preliminary Response, *CaptionCall LLC v. Ultratec Inc.,* Case IPR2015-01885, U.S. Pat. No. 8,515,024, Dec. 17, 2015, 25 pages.
Declaration of Benedict J. Occhiogrosso, In Re: U.S. Pat. No. 8,515,024, Case IPR2015-01885, In the United States Patent and Trademark Office Before the Patent Trial and Appeal Board, Sep. 8, 2015, 23 pages.
In the United States Patent and Trademark Office Before the Patent Trial and Appeal Board, Petition for Inter Partes Review of Claims 1, 3, 6, 9-11, 13, 15, 19-23, 25-27, 34, and 36-38 of U.S. Pat. No. 7,881,441, *CaptionCall LLC v. Ultratec Inc.,* Case IPR2015-01886, U.S. Pat. No. 7,881,441, Sep. 8, 2015, 61 pages.
Declaration of Benedict J. Occhiogrosso, In Re: U.S. Pat. No. 7,881,441, Case IPR2015-01886, In the United States Patent and Trademark Office Before the Patent Trial and Appeal Board, Sep. 8, 2015, 29 pages.

\* cited by examiner

CAPTIONED TELEPHONE SERVICE

CROSS-REFERENCE TO RELATED APPLICATION

This application claims priority from and is a continuation of U.S. patent application Ser. No. 16/677,293, filed Nov. 7, 2019, which is a continuation of U.S. patent application Ser. No. 14/969,507, filed Dec. 15, 2015, and issued as U.S. Pat. No. 10,491,746 on Nov. 26, 2019, which is a continuation of U.S. patent application Ser. No. 13/950,860, filed Jul. 25, 2013, and issued as U.S. Pat. No. 10,587,751 on Mar. 10, 2020, which is a continuation of U.S. patent application Ser. No. 12/686,688, filed Jan. 13, 2010, and issued as U.S. Pat. No. 8,515,024 on Aug. 20, 2013, which is a continuation of U.S. patent application Ser. No. 11/061,682, filed Feb. 18, 2005, and issued as U.S. Pat. No. 7,660,398 on Feb. 9, 2010, which claims the benefit of priority to provisional patent application Ser. No. 60/545,519, filed Feb. 18, 2004, all of which are hereby incorporated by reference as if fully set forth herein.

STATEMENT REGARDING FEDERALLY SPONSORED RESEARCH OR DEVELOPMENT

Not applicable.

BACKGROUND OF THE INVENTION

Modern telecommunication systems include facilities to permit use of telecommunication systems by those who are deaf or hard of hearing. The best known form of such communication makes use of devices known as telecommunication devices for the deaf (TDD), also known as text telephones (TTY). TTY communication is widely used between deaf people. Hearing users communicate with deaf users who are users of TDD devices through so-called "relays." A relay is a telecommunication intermediary service, funded by telephone communication surcharges, which is intended to permit deaf or hard of hearing people to utilize the normal telephone network. At a relay, an operator referred to as a call assistant intermediates between a deaf user and a hearing person by communicating with the deaf person using a TDD and communicating with the hearing person by voice over a normal telephone line.

Previous technology has enabled the relay system to be used to provide a form of enhanced telephone communication for people who are not deaf, but are hard of hearing. This approach to telecommunications is exemplified by U.S. Pat. Nos. 6,307,921 and 6,075,842, the disclosure of which is incorporated by reference. These patents, entitled "Text Enhanced Telephony," referred to a system that provides captioned telephone service, a service currently marketed under the service mark Captel by Ultratec, Inc. and its licensees. A captioned telephone, or telephone enabled to do text enhanced telephony, is capable of providing a text message to a user of the words which are transmitted to that user over a conventional telephone line. The captioned telephone user receives normal voice from the party on the other end of the line, as well as a text transcription of the words spoken by the other party, so that the user may refer to the text for missed words in the conversation. This capability is made possible by automation in the relay which permits text or captioning to be delivered nearly simultaneously with voice. In addition, the telephone station of the assisted user is specially configured to facilitate the set up of captioned telephone calls.

In its original conception, the text assisted telephone system was designed to be deliverable to and operated by a user over a single telephone line to the user. As the costs of telephone service drops, it is now apparent that many users of captioned telephone service may elect to use two telephone lines to take full advantage of the opportunity for improved service that comes from text enhanced telephone. The concept of using two telephone lines to provide captioned telephone service in general to an assisted user is disclosed in U.S. Pat. No. 6,603,835, the disclosure of which is incorporated herein by reference.

BRIEF SUMMARY OF THE INVENTION

In one aspect, a captioning system includes an assisted user's communication system, including a display screen, a microphone, a speaker, an input device for specifying a calling number of a hearing user's communication device, and a processor linked to the display screen microphone, speaker and input device. The processor is programmed to perform the steps of: (i) upon entry of a calling number via the input device, scanning the calling number, (ii) identifying a type of the calling number; (iii) where the type is a first type, performing a first process to initiate a remote captioning service; and (iv) where the type is a second type, performing a second process to initiate a remote captioning service where the second process is different than the first process.

In another aspect, a captioning system includes an assisted user's communication system, including a display screen, a microphone, a speaker, an input device for specifying a calling number of a hearing user's communication device, and a processor linked to the display screen microphone, speaker and input device. The processor is programmed to perform the steps of: (i) upon entry of a calling number via the input device, scanning the calling number, (ii) identifying a type of the calling number as an emergency type or a non-emergency type; (iii) where the calling number is an emergency type, performing an expedited process to initiate a remote captioning service; and (iv) where the calling number is not an emergency type, performing a non-expedited process to initiate a remote captioning service.

In still another aspect, a captioning system includes an assisted user's communication system, including a display screen, a microphone, a speaker, an input device for specifying a calling number of a hearing user's communication device, and a processor linked to the display screen microphone, speaker and input device. The processor is usable to link to a remote captioning service in at least first and second different ways and is programmed to perform the steps of, upon connection of the communication system to a communication network: (i) detecting a type of communication network connection; and (ii) based on the type of communication network connection, configuring the communication system to link to the remote captioning service in one of the first and second different ways.

Other objects, advantages and features of the present invention will become apparent from the following specification.

DETAILED DESCRIPTION OF THE INVENTION

Figure 1:
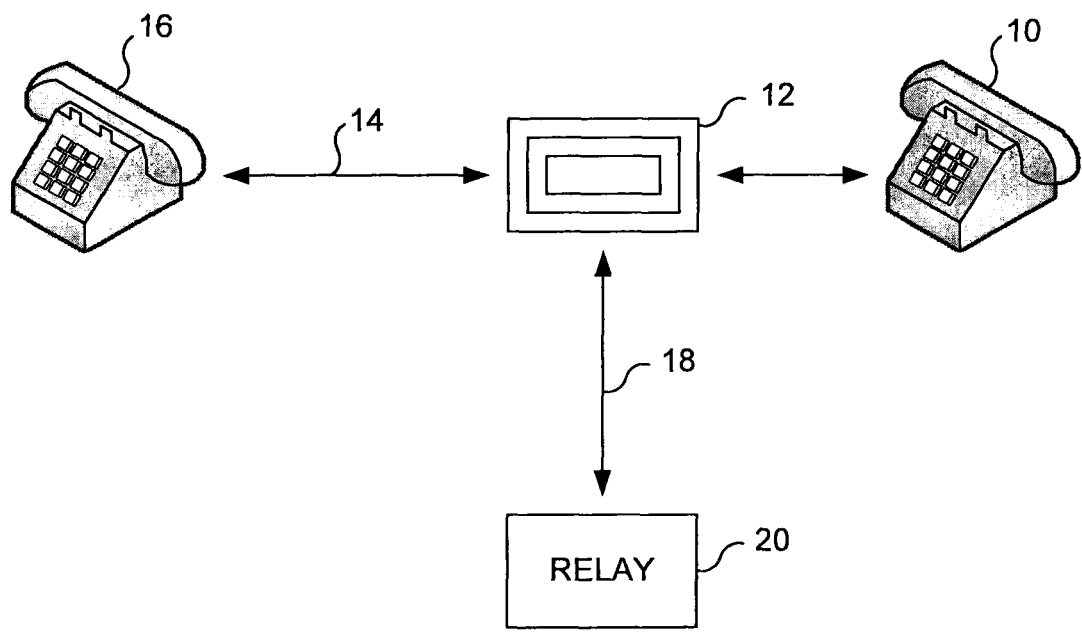
FIG. 1 is a schematic view of the arrangement of the parties in a captioned telephone call system as described here.

Shown in FIG. 1 is a schematic view of the arrangement for a generalized two line captioned telephone service. An assisted user is positioned to use a telephone 10. The user telephone is connected to a captioned telephone device 12, which is interposed between the telephone 10 and a first telephone line 14. As an alternative, the captioned telephone device 12 is preferably built into the same physical case as the telephone 10, but these are shown in separate boxes in FIG. 1 for purposed of clarity of illustration. The first telephone line 14 connects to a remote telephone 16, which is the station of the caller or person to whom the assisted user wishes to speak. The captioned telephone device is also connected to a second telephone line 18, which is connected at its other end to a relay, indicated at 20. The relay 20 is preferably a relay of the type described in U.S. Pat. No. 6,233,314, among others, and currently commercially available under the name Captel™ relay, from CapTel, Inc.

In its general operation, the person at the remote telephone 16 would converse normally with the assisted user at the telephone 10. At the captioned telephone device 12, the voice of the remote user is passed along the second telephone line 18 to the relay 20. At the relay 20, the voice carrying the spoken words of the remote user is converted into a text or digital massage stream that is passed back to the captioned telephone device 12 over the same telephone line 18. The captioned telephone device 12 displays the text of the digital message stream received from the relay 20, so that the assisted user can read the words spoken by the remote user. The captioned telephone device 12 is constructed to not pass voice or digital signals from the relay onto the first telephone line, so that the digital communication tones from the relay do not distract or bother the users. If the assisted user can hear and understand the words spoken by the remote user, the assisted user can respond normally. If the assisted user has difficulty in hearing or understanding any words spoken by the remote user, those words are displayed for the assisted user by the captioned telephone device so that the assisted user can read the words. Thus the service is unobtrusive and available as needed to help the assisted user.

Figure 2:
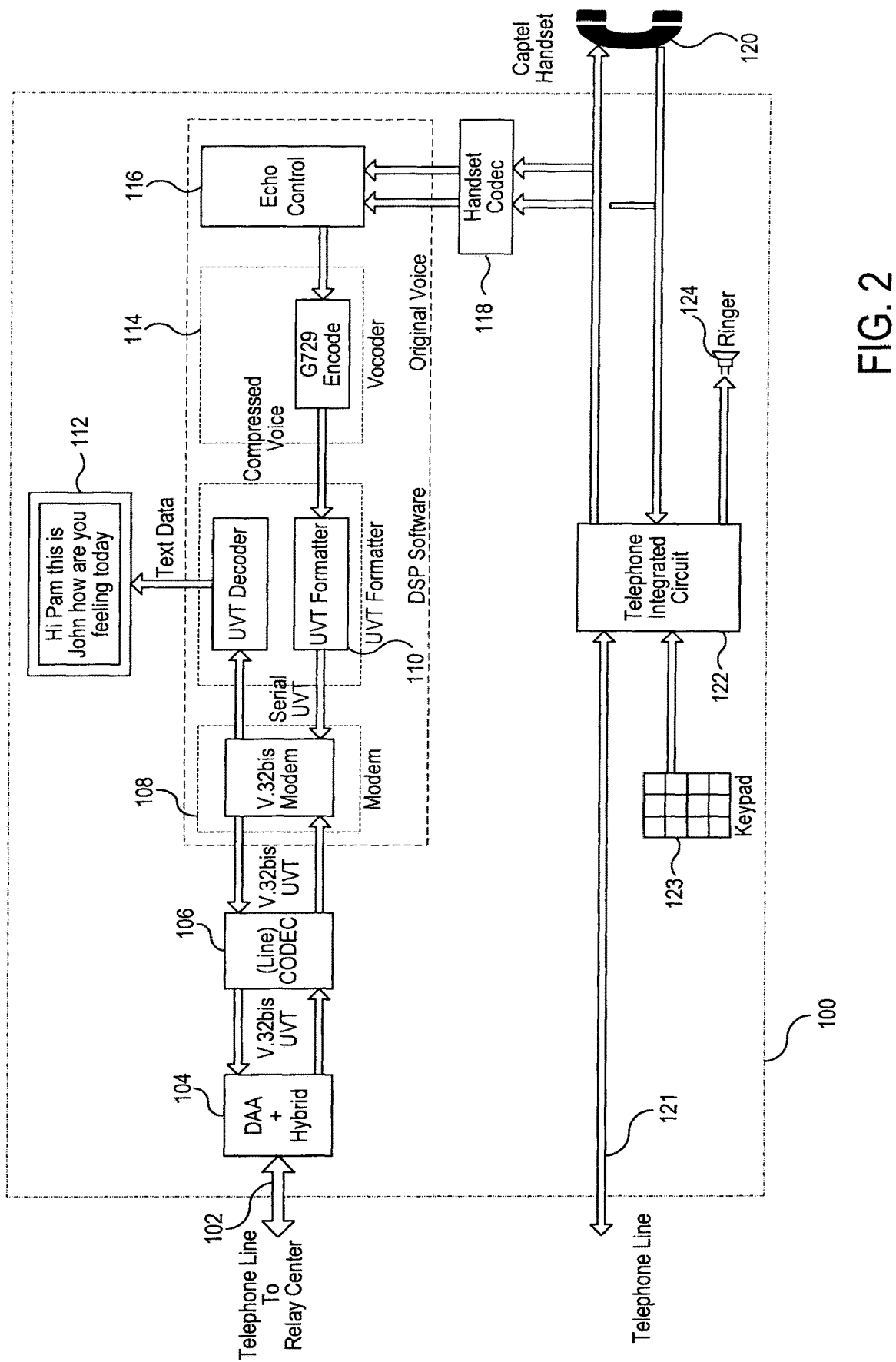
FIG. 2 is a schematic diagram or a combined telephone and captioned telephone device.

In the preferred embodiment of the captioned telephone device 12, the captioned telephone device 12 and the telephone 10 are combined in a single device. Shown in FIG. 2 is a captioned telephone device 100 which embodies that combination. This device is also intended to support a communication, command and signaling protocol known as UVT to facilitate captioned call, as is described in more detail in U.S. Pat. No. 6,504,910, which is hereby incorporated by reference. In FIG. 2 the interior components of the captioned telephone device 100 are illustrated in block diagrams indicating the digital logic components from which the device may be constructed. It is preferred, however, that the components within the dotted lines in FIG. 2, labeled as DSP software, actually be implemented in the form of a software routine operating a digital signal processing integrated circuit to perform the functions of the illustrated blocks. In the captioned telephone device 100, the telephonic connection to the relay, i.e. the connection to the second telephone line 18, is indicated at 102. The input telephonic signal connects to a DAA and hybrid 104 and then to a codec 106 to digitize input signals. Following the codec 106 is a modem 108, the output of which connects to a UVT formatter 110. The UVT formatter 110 formats the digitized voice signals from the first telephone line for transmission to the relay service and to decode the digital text signals received. The digitized text signals are transferred from the UVT formatter 110 to a visually readable display 112 on which the text can be displayed for the assisted user. Voice signals from the first telephone line 14, indicated here as 121, are converted to digital signals by a codec 118. An echo control circuit 116 is used to remove the voice of the assisted user at a handset 120 from the voices of the other party. The output of the echo control 116 is sent to a vocoder 114 for compression, in this case, using G.729 protocols. The voice is passed to the UVT formatter 110 and on to a modem 108 for transmission to the relay center over the telephone line 102. In summary, the assisted station passes the voice from the first telephone line 121 to the speaker in the handset for the assisted user and also compresses the voice for transmission to the relay service over the telephone line 102. At the same time, it decodes the digital text stream and presents the text stream as a visual text message to the user on the display 112. The assisted user thus receives both the voice of the hearing user from the first telephone line and is provided a text display of the words spoken by the hearing user from the digital test sent over the second telephone line.

In general, the specification below describes only the differences in the operation of an captioned telephone service between that logically configured as shown in FIG. 1 and a similar captioned telephone device operating an a single telephone line. However, it should be understood that the physical embodiment of the devices and the telephone lines is subject to much variation. For example, while plain, unfeatured, land-line "plain old telephone services" are illustrated in FIG. 1, the telephone lines or connections themselves may be any of the more modern wired or wireless telephones available today. The captioned telephone device is, for example, preferably built in the same device as the telephone 12, as illustrated in FIG. 2. Similarly, the telephone lines 14 and 18 can be simple land-line two-wire telephone lines, but they could also be any other form of modern telephone interconnection, including cellular connections, PCS connections, or even data connections such as internet protocol (IP) connected across the internet or other data connection service. While two single telephone connections can be used for this function it is also understood that a single IP physical connection can serve as the two separate connections. Thus the term telephone line or telephone connection as used in this document is intended to be used to describe a voice capable interconnection between two remote telephone devices rather than being restricted to a physical pair of wires. In any event, as will be seen from the following description, a number of features of addition functionality are possible using a two-line captioned telephone connection that have not been previously contemplated. Several of such features are discussed and the features can be implemented as a group or individually.

Dial Delay

Assume that the party initiating the call session is the assisted user at the telephone 10. Assume as well that the assisted user wants the default configuration to be that his or her calls are a text assisted, or are captioned. The user picks up the handset of the telephone 10 and dials as normal the telephone number of the remote user. However, if the remote user was dialed immediately, there is a chance that the captioning service would not be ready to go at the time the remote user answers his or her telephone 16. So the captioned telephone device 12 at the station of the assisted user is programmed to intercept the dialing of the remote user and to instead first dial the relay 20 on telephone line 18. Typically, in the simplest embodiment, the captioned telephone device could simply store DTMF tones for the number dialed by the assisted user. When the relay 20 is engaged and ready to function, a command is sent over the telephone line 18 to the captioned telephone device 12 to initiate the call to the remote user. The captioned telephone device 12 then calls the telephone 14 of the remote user to initiate the call, as by placing the DTMF tones for the on the first telephone line 12 to make the call.

Using this concept of intercepting and storing the number called by the assisted user, the captioning function provided by the relay 20 is available from the start of the call. If, for example, the call does not go through properly, and a message is received from the telephone network, such as "all circuits are busy now, please try again later," that message can be transmitted in text to the assisted user. If the assisted is so hearing impaired that the ringing or answering of the remote telephone cannot be understood, text messages from the relay can supply the needed information.

Again while the simplest embodiment of this feature is the interception of the DTMF tones, and the storage of those tones for later uses, the functional equivalent of that technique for other forms of telephone interconnection are also envisioned. If, for example, the telephone connection is actually through IP access over the internet, the captioned telephone device 12 could store the uniform resource address (URL) for the remote user, connect to the relay 20 by internet access or conventional telephone connection, and then implement the connection to the remote user to complete the call. Another alternative as to the implementation of this feature is to use a fixed time delay for dialing the remote station instead of waiting for an acknowledgement from the relay. A fixed time delay of a few seconds would normally suffice for the relay to be connected and up and running.

One safety detail is required to properly implement this feature. If the number dialed by the assisted user is "911" or other emergency assistance number, then the dial should not be delayed at all, and the dialing information should be immediately presented to the telephone network. Emergency service facilities, such as the various 911 services in the United States, are normally equipped with the capability to receive and communicate with hearing impaired callers directly, without the need for an intermediate relay. In addition, it is desirable that the response time for receipt and handling of the emergency services call not be impacted by other factors such as a potential busy time for service usage at the relay. Hence it is preferred that the captioned telephone device 12, whether it is a separate box or a part of the assisted user's telephone, scan the numbers dialed by the assisted user and immediately pass along any call to the local emergency services number regardless of the user's preferences about relay assistance in normal calls. In addition, when dialing 9-1-1 is detected, the captioned telephone device 12 can be equipped to have a second DTMF number or other method of connecting to the relay 20 which has priority over other calls such that the user dialing 9-1-1 is routed to the relay 20 and given captioning service in the minimum possible time delay.

Line Testing

A feature that modern telephone equipment makes possible is line testing to see if a telephone line is "on-hook" (meaning unused) or "off-hook" (meaning that the line is in use) This feature or capability tests the telephone line to which it is connected, and returns a signal of in use, not in use, or ringing. For two-line captioned telephone service, the ability to test line conditions permits condition responsive actuation of variations of the captioned telephone service.

For example, assume that the telephone 10 of the assisted user is not in use, but set up to answer and automatically initiate captioning by a call on the second telephone line 18 to the relay 20. Then when a call is received by the telephone 10, it can test the condition of the second telephone line 18 before responding. If the telephone line 18 is available, the assisted users' station can initiate the call to the relay to secure captioning service even before answering the incoming call on the first telephone line. If the second telephone line is busy, then station can inform the user and give the assisted user the option to capture the number of the caller using Caller-ID, and then call that same party right back using single line captioned service using only the first telephone line. The assisted user could also wait until the second line clears and then initiate a two-line captioned call.

Automated Mode Choice

As describe above, the captioned telephone device can sense the status of the telephone lines as to whether they are in use of not. In most cases, the device will use the same line, here telephone line 14, to connect to the remote caller, and a second telephone line 18 to connect to the relay. In this configuration, the assisted user would generally give out the telephone number of the first telephone line 14 as their telephone number. If an incoming call is received by the station of the assisted user, while the telephone is ringing, the captioned telephone device 12 checks the status of the second telephone line 18. If the second telephone line 18 is available, the normal implementation of two-line captioning can proceed. If the second telephone line is in use, the device then displays for the assisted user a message such as "Line 2 is in use, no captions available," or other warning about the status of captioning. The assisted user can then decide if he or she wishes to answer the line and conduct the telephone call without captioning. Since the captioned telephone device preferably includes built-in Caller ID functionality, the assisted user can evaluate the availability for 2-line captioning service before picking up the telephone to answer the call.

The same information is, of course, available when the assisted user is the person doing the dialing. The assisted user dials a number, with the captioned telephone device set up to normally invoke captioning from the relay over the second telephone line 18. The captioned telephone device 12 senses, however, that the second line 18 is busy, and therefore provides a message to the assisted user such as "Line 2 not available, Use 1 line captioning?" If the assisted user elects to proceed with 1-line captioning, as by pressing a key on the captioned telephone device, the captioned telephone device would first call the relay 20 and pass to the relay command information so as to set the call up as a single line captioned call. In that mode, the relay is interposed between the assisted and remote callers, as described in U.S. Pat. No. 5,724,405. If the assisted user does not wish to proceed with single line captioning, the assisted user can simply hang up and try again later when the second line might be available.

Automated Line Selection

As described above, the captioned telephone device can detect the status of the two telephone lines, and use that information in the set up of the captioned telephone call. The assisted user will normally have the first telephone line 14 set up to be the primary telephone line. In this configuration, the first line 14 would normally be the line on which the assisted user places and receives calls. However, the captioned telephone device 12 will also detect an incoming ring on the second telephone line 18 and signal to the assisted user that an incoming call is being detected. Such a signal may need to be a visual signal (such as displaying a message such as "Ring on Line 2" for users who cannot hear at all, while for a hearing user the signal for an incoming call on the second line can be a ringing tone different from that tone used with the first telephone line 14. If the captioned telephone device has been configured to set up a 2-line captioned telephone call, the device will then dial the relay 20 over the first telephone line and reverse the usual configuration.

Automated Installation

As mentioned, the captioned telephone device 12 is provided with the ability to sense the status of the two telephone lines to which it is connected. This permits automated set up of the device during installation. The user simply connects the telephone jacks to the standard ports provided on the captioned telephone device. The software in the device will detect that a telephone line is connected and automatically configure the software to use that telephone line as the first telephone line. If only one line is connected to the device, it still automatically set itself up to support one-line captioning for any telephone calls made. If the user has two telephone lines available, and the lines are connected to the captioned telephone device, it will detect that and will automatically configure itself to be able to support two-line captioning service. Used in this way, it is not mandatory that the assisted user actually designate either of the two telephone lines as their first or second line. The captioned telephone device will automatically configure itself for the telephone line or lines available and may the best adaptation that it can to any incoming or outgoing call. The captioned telephone device does have the alternative to designate one of the lines as the primary line, if that is needed for any reason.

Dial on Ring

When the assisted user receives a call using the captioned telephone service, the user answers the telephone just as they normally would, by picking up the handset or actuating the speakerphone, if equipped with one. When the start of an incoming call is detected by the captioned telephone device, it then checks the status of the control buttons on the face of the device and, assuming the captioning is selected, the captioned telephone device immediately dials the number of the relay. Normally it will take anywhere from a few seconds to tens of seconds before the captioning service is set up though the relay, depending on how busy the relay is at that moment. In most cases, the captioning service can be configured in ten to fifteen seconds. Obviously, by initiating the interconnection to the relay before the assisted user even picks up the telephone, the time required to begin captioning the call when it is answered is decreased. Note that since the largest cost at the relay is the call assistant, the relay would not assign a call assistant to the call until both parties have picked up their phones and are on the line. In that way, the cost of attention by a call assistant to the call is avoided if the assisted user does not actually answer the call.

Other strategies can be used to decrease the time for connection and set up. If an ISDN line is used for the second telephone line 18, the speed is increased since ISDN dialing is much faster than traditional DTMF dialing. However, since ISDN service is more expensive than traditional plain residential telephone service, other options may be more commercial acceptable to consumers. The captioning device can use Internet Protocol (IP) signaling to communicate with the relay service center. This would allow direct digital or internet connections for the delivery of the captions, i.e. the logical second telephone line 18 would actually be an IP connection. Since broadband connection to the internet, wired and unwired, is becoming increasingly common, this alternative will be a preferred choice for many consumers.

End of Call

Another method for reducing set up time is to briefly hold the connection to the relay, established over the second telephone line, after the assisted user ends the call on the first telephone line 14. This is to provide for the possibility that the caller is about to make another call. If the assisted user is about to make another call, the fact that the connection to the relay has been maintained shortens the time necessary to set up the second call. When the assisted user begins the second call, the relay is already connected and captioning can begin immediately. The holding period should be brief, i.e. 2 to 10 seconds. When the hold timer expires, the captioned telephone device 12 sends a UVT message to the relay indicating that a disconnect is in progress, and it hangs up on the telephone line to the relay. The receipt of the UVT disconnect message also signal to the captioning service that the encounter is finished for the creation of a billing record of the call.

Echo Cancellation

For single line captioned telephone service, echo cancellation is used in the equipment of the relay for the captioned telephone service for two reasons. The first reason is the captioning system uses digitized and compressed audio to transmit voice and the delays inherent in this process would cause echo back to the user, were it not for the fact that the echo is not suppressed by the software. The second reason is to remove or cancel the voice of the assisted user from the audio received from the hearing party or the remote user. This is done so that the call assistant at the relay only hears the voice of the remote user that is to be captioned and is not confused by the voice of the assisted user.

When the captioning service is provided using two lines, echo cancellation is still needed, but the arrangement of the echo cancellation is significantly different. The echo cancellation now is located in the captioned telephone device at the location of the assisted user. The echo cancellation circuitry or function acts to separate the local voice of the assisted user from any other voices on the first telephone line 14 as presented to the call assistant. In the 2-line arrangement, this echo cancellation at the captioned telephone device provides the same benefit to the call assistant at the relay. The echo cancellation is located between the first telephone lines 14 and the handset microphone of the assisted user, so that the second telephone line 18 does not transmit to the relay any of the voice of the assisted user at telephone 10 to the relay. Thus the call assistant at the relay 20 is not exposed to the voice of the assisted user. This makes the job of the call assistant easier, since the call assistant captions the voice he or she hears.

The arrangement provides a subsidiary benefit in that it permits other members of the household to also participate in the call, by picking up an extension telephone and joining in the conversation. The voice or voices of the other people on the line are also sent to the relay for captioning. Only the voice of the assisted user, at the station of the captioned telephone device 12, is subjected to the echo cancellation. So the assisted user also gains the benefit of captioning of the other voices in the conversation. For single line captioning service, participation by other members of the household is normally not possible because the telephone communication to the house is in the form of a data stream carrying voice and text and is not a voice connection.

Billing Information Transmittal

For traditional TTY relay calls and for single-line captioning service calls, the relay uses the automatic number identification (ANI), or calling party number (CPN), of the assisted user and the dialed number of the remote user to determine who will be billed for the relay service performed. In the U.S., and some other countries, relay service is usually paid for by third party payer, funded by governmental mandate to provide telephone communication for the hearing impaired at the same cost as that available to the hearing. Typically in the U.S., calls that are dialed back to the same state as the originating caller (intrastate calls) are paid for by the state of the two parties to the conversation. Note that the relay may or may not be in the state in which the two parties connect for a conversation. The cost of the relay services for calls that cross a state boundary (interstate calls) are paid for by the National Exchange Carriers Association (NECA). NECA maintains a system of sharing costs and revenue for interstate telephone traffic that crosses state regulatory boundaries. The state agencies and NECA share the costs for toll free calls by an assisted user.

For two-line captioning service, the assisted user dials the other party directly. Hence, the relay is no longer in the middle of the call, between the parties. Therefore, it is not inherently apparent to the relay whether the call is interstate or intrastate. So the captioned telephone device is programmed to keep a record of the telephone number dialed by the assisted user and to report this number to the relay as a part of the set up of the captioning service for the call. A UVT command is used to send the dialing information to the relay for capture and association with the billing records for the call. This information transmission allows the relay service providing the captioning to determine the appropriate billing type for calls dialed by the assisted user. Similarly, if caller ID information is received and captured as a part of an incoming call, the information can also be transmitted to the relay in a similar format to inform the relay of the category of the call.

Call Answering Service

With two-line captioned telephone service, it is readily possible to add automated message answering service as an added feature. When one of the telephone lines rings with an incoming call, the software of the captioned telephone device, configured for automatic answering, waits for a predetermined number of rings and then answers the line. The captioned telephone device meanwhile connects to the relay over the other telephone line. The captioned telephone device then plays a pre-recorded message typical of telephone answering machines for the benefit of the caller. The calling party responds by leaving a voice message, which is transmitted to the captioning relay 20 for transcription into a text message. The captioned telephone device can also capture the voice or the telephone number of the calling party. The transcription of the message is transmitted by the relay to the captioned telephone device and is stored as well as a text message. When the assisted user returns, the text message is stored in memory of the captioned telephone device 12 and the voice message and/or number of the calling party can be stored as well.

When the assisted user returns, he or she lifts the handset of the telephone and presses a button on the captioned telephone device (or the combined device if the telephone is a part of the device). The captioned telephone device is programmed to display the text message on its display and, if desired, play back the voice message and/or telephone number of the calling party. The message storage, either voice or text or both, could also take place at the relay, and if this alternative is implemented, when the user returns and asks for messages, the relay would be called and the stored message downloaded. Note that the call assistant is not required for this message playback service and hence the cost would not be large.

Selection of Service by Call Type

In its normal mode of operation, the captioned telephone device automatically dials to the captioning relay 20, using a pre-configured telephone number (or IP address) for the relay. The assisted user normally will not need to know or to dial the relay number to control this function. However, it is a useful variant that the captioning device be configured to dial different numbers depending on the type and/or the number that the assisted user dials. For example, as stated earlier, if the assisted user dials an emergency assistance number, such as 911, the software for the captioned telephone device can be programmed to dial a specific priority access number into the emergency response system. Other specific functions or calls that use this feature include captioning in other languages, retrieving messages from the captioned relay service, installing updates to the software for the captioned telephone device, and 900 calls. 900 calls are calls which authorize additional costs to the caller for a service offered by the 900 number and therefor 900 calls cost more than normal telephone calls. As a result, many telephone system users elect to disable their telephones from calling 900 numbers.

Normally the captioned telephone user will access the captioning relay by means of toll-free number (800 numbers in the U. S.). If the assisted call requests the relay to dial a 900 number, the 900 number block at the station of the user is avoided. Normally, an outside service, such as the relay, cannot determine if 900 number access is blocked for the user's telephone. To avoid this issue, the captioned telephone device could test the telephone numbers it handles, and be programmed to not pass along to the relay any 900 or other objectionable numbers.

We claim:

1. A method of operating a captioned telephone call in which an assisted user's (AU's) captioned device is connected by a first line to a hearing user's (HU's) device and a second line to a relay providing captioning for a conversation, the captioned device including a microphone, a speaker, and a display screen, the method comprising the steps of:

capturing an AU's voice signal via the microphone;

transmitting the AU's voice signal from the captioned device to the HU's device on the first line;

obtaining a combined voice signal from the first connection at the captioned device, the combined voice signal including the AU's voice signal and an HU's voice signal generated at the HU's communication device;

cancelling the AU's voice signal from the combined voice signal to generate the HU's voice signal independent of the AU's voice signal;

broadcasting the HU's voice signal via the speaker;

transmitting the HU's voice signal that is independent of the AU's voice signal to the relay;

receiving captions at the captioned device from the relay corresponding to the HU's voice signal; and presenting the captions as text on the display screen.

2. The method of claim 1 wherein the step of transmitting the HU's voice signal to the relay includes transmitting the HU's voice signal to the relay on a second connection that is independent of the first connection.

3. The method of claim 2 wherein the step of receiving captions includes receiving the captions at the captioned device on the second connection.

4. The method of claim 1 wherein the step of cancelling includes using echo cancellation to cancel the AU's voice signal.

5. The method of claim 1 further including the steps of, upon detecting an incoming call on the first connection, without any assisted user input subsequent to a start of the call, checking a status of a caption control feature and, when a captioning default is selected, automatically calling the relay on a second connection to initiate captioning service set up.

6. The method of claim 5 wherein captions are generated by a call assistant at the relay, the method further including the step of, subsequent to establishing a communication link to the relay, assigning a call assistant to the incoming call.

7. The method of claim 6 wherein the step of assigning a call assistant includes assigning the call assistant to the incoming call subsequent to answering of the incoming call.

8. A method of operating a captioned telephone call in which an assisted user's (AU's) captioned device is connected by a first connection to a hearing user's (HU's) device, the captioned device including a microphone and a display screen, the method comprising the steps of:
capturing an AU's voice signal via the microphone;
transmitting the AU's voice signal from the captioned device to the HU's communication device on the first connection;
obtaining a combined voice signal from the first connection at the captioned device, the combined voice signal including the AU's voice signal and an HU's voice signal generated at the HU's communication device;
cancelling the AU's voice signal from the combined voice signal at the captioned device to generate the HU's voice signal independent of the AU's voice signal;
transcribing the HU's voice signal independent of the AU's voice signal to generate captions corresponding to the HU's voice signal; and
presenting the captions as text on the display screen.

9. The method of claim 8 also for use with a remote captioning relay, the method further including the step of transmitting the HU's voice signal independent of the AU's voice signal to the remote relay, the step of transcribing the HU's voice signal to generate captions including transcribing the HU's voice signal to generate captions at the remote relay, the method further including transmitting the captions from the relay to the captioned device.

10. The method of claim 9 wherein the step of transmitting to the remote relay includes establishing a communication link on a second connection from the captioned device to the remote relay and transmitting the HU's voice signal on the second connection.

11. The method of claim 10 wherein the step of transmitting the captions from the relay to the captioned device includes transmitting the captions on the second connection.

12. The method of claim 9 wherein the step of transcribing includes broadcasting the HU's voice signal to a call assistant at the relay and receiving input from the call assistant to generate the captions.

13. A method of operating a captioned telephone call in which an assisted user's (AU's) captioned device is connected by a first connection to a hearing user's (HU's) device and a second connection to a relay providing captioning for a conversation, the captioned device including a microphone, a speaker, and a display screen, the method comprising the steps of:
capturing an AU's voice signal via the microphone;
transmitting the AU's voice signal from the captioned device to the HU's device on the first connection;
obtaining an audio signal including at least an HU's voice signal generated by the HU's device at the captioned device;
broadcasting the HU's voice signal via the speaker;
transmitting the HU's voice signal independent of the AU's voice signal to the relay;
receiving captions at the captioned device from the relay corresponding to the HU's voice signal; and
presenting the captions as text on the display screen.

14. The method of claim 13 wherein the step of obtaining an audio signal includes obtaining an audio signal including each of the HU's voice signal and the AU's voice signal.

15. The method of claim 14 wherein the audio signal is obtained from the first connection.

16. The method of claim 15 further including removing the AU's voice signal from the audio signal at the captioned device to generate the HU's voice signal independent of the AU's voice signal.

17. The method of claim 13 wherein the step of transmitting to the relay includes establishing a communication link on a second connection from the captioned device to the relay and transmitting the HU's voice signal on the second connection.

18. The method of claim 13 wherein the step of receiving captions from the relay at the captioned device includes transmitting the captions from the relay to the captioned device on the second connection.

19. A method of operating a captioning relay to provide a captioning service to an assisted user (AU) that is using an AU's captioned device to communicate with a hearing user (HU) that is using an HU's device, the captioned device including a display screen, the method comprising the steps of:
establishing a communication session between the captioned device and the relay;
during a voice communication session in which an AU's voice signal is transmitted on a first connection from the captioned device to the HU's device and an HU's voice signal is transmitted on the first connection from the HU's device to the captioned device, receiving the HU's voice signal independent of an assisted user's voice signal from the captioned device;
transcribing the HU's voice signal at the relay to generate captions corresponding to the HU's voice signal; and
transmitting the captions to the captioned device for display on the display screen.

20. A method of operating a captioned telephone call in which an assisted user's (AU's) captioned device is connected by a first connection to a hearing user's (HU's) device and a second connection to a relay providing captioning for a conversation, the captioned device including a microphone, a speaker, and a display screen, the method comprising the steps of:
capturing the AU's voice signal via the microphone;
transmitting the AU's voice signal from the captioned device to the HU's communication device on the connection;
receiving the HU's voice signal from the HU's communication device at the captioned device on the connection;
broadcasting the HU's voice to the AU via the speaker;
transmitting the HU's voice signal independent of the AU's voice signal from the captioned device to the relay;

receive captions at the captioned device from the relay corresponding to the HU's voice signal; and presenting the captions as text on the display screen.

21. A method of operating a captioned telephone call in which an assisted user's (AU's) captioned device is connected by a first connection to a hearing user's (HU's) device and a second connection to a relay providing captioning for a conversation, the captioned device including a microphone, a speaker, and a display screen, the method comprising the steps of:

capturing an AU's voice signal via the microphone;

transmitting the AU's voice signal from the captioned device to the HU's device on the first connection;

obtaining a combined voice signal at the captioned device, the combined voice signal including the AU's voice signal and an HU's voice signal generated at the HU's communication device;

modifying the combined voice signal at the captioned device to generate a modified voice signal where the HU's voice signal persists and the AU's voice signal is altered;

broadcasting the HU's voice signal via the speaker;

transmitting the modified voice signal to the relay;

receiving captions at the captioned device from the relay corresponding to the HU's voice signal; and presenting the captions as text on the display screen.

22. The method of claim 21 wherein the step of modifying the combined voice signal includes cancelling the AU's voice signal to generate the modified voice signal that includes the HU's voice signal independent of the AU's voice signal.

23. A method of operating a captioning relay to provide a captioning service to an assisted user (AU) that is using an AU's captioned device to communicate with a hearing user (HU) that is using an HU's device, the captioned device including a display screen, the method comprising the steps of:

establishing a communication session between the captioned device and the relay;

during a voice communication session between the AU's captioned device and the HU's device in which an AU's original voice signal is transmitted from the captioned device to the HU's device and an HU's original voice signal is transmitted from the HU's device to the captioned device:

(i) receiving voice communications from the captioned device that include the HU's original voice signal and do not include the AU's original voice signal;

(ii) transcribing the HU's original voice signal at the relay to generate captions corresponding to the HU's original voice signal; and transmitting the captions to the captioned device for display on the display screen.

24. The method of claim 23 wherein the received voice communications include only the HU's original voice signal.

25. The method of claim 16 wherein the step of removing the AU's voice signal includes using echo cancellation to remove the AU's voice signal.

26. The method of claim 13 further including the steps of, upon detecting an incoming call on the first connection, without any assisted user input subsequent to a start of the call, checking a status of a caption control feature and, when a captioning default is selected, automatically calling the relay on a second connection to initiate captioning service set up.

27. The method of claim 26 wherein captions are generated by a call assistant at the relay, the method further including the step of, subsequent to establishing a communication link to the relay, assigning a call assistant to the incoming call.

28. The method of claim 27 wherein the step of assigning a call assistant includes assigning the call assistant to the incoming call subsequent to answering of the incoming call.

29. The method of claim 13 wherein the first connection is a telephone interconnection.

30. The method of claim 29 wherein the telephone interconnection is an internet connection.

31. The method of claim 29 wherein the telephone interconnection in a wireless connection.

32. The method of claim 19 further including audibly presenting the HU voice signal to a call assistant (CA) at the relay, receiving input from the CA based on the HU voice signal and in response generating the captions corresponding to the HU voice signal.

33. The method of claim 19 wherein the HU's voice signal is received on a second connection independent of the first connection at the relay from the AU's device.

34. The method of claim 33 wherein the captions are transmitted to the captioned device on the second connection.

35. The method of claim 19 wherein the captioned device obtains a combined AU-HU voice signal and removes the AU voice signal from the combined signal prior to transmitting the HU voice signal independent of the assisted user's voice signal to the relay for captioning.

36. The method of claim 20 wherein the HU's voice signal is transmitted to the relay via a second connection that is independent of the first connection.

37. The method of claim 36 wherein the step of receiving captions includes receiving the captions on the second connection.

38. The method of claim 20 further including the step of separating the HU's voice signal from the AU's voice signal prior to transmitting the HU's voice signal to the relay.

39. The method of claim 38 wherein the step of separating includes obtaining a combined voice signal including the HU's voice signal and the AU's voice signal and cancelling the AU's voice signal from the combined voice signal.

40. The method of claim 21 wherein the modified voice signal is transmitted to the relay via a second connection separate from the first connection.

41. The method of claim 40 wherein the captions are received at the captioned device via the second connection.

42. The method of claim 21 wherein the step of obtaining a combined voice signal includes obtaining the combined voice signal from the first connection.

43. The method of claim 42 wherein the step of transmitting the modified voice signal includes transmitting the modified voice signal via a connection that is separate from the first connection.

44. The method of claim 23 wherein the step of receiving voice communications that do not include the AU's original voice signal includes receiving voice communications where the AU's original voice signal has been modified.

45. The method of claim 44 wherein the step of receiving voice communications that do not include the AU's original voice signal includes receiving voice communications where the AU's original voice signal has been cancelled.

46. The method of claim 45 wherein the step of transcribing includes presenting the HU voice signal to a call assistant (CA) and receiving input from the CA resulting in the captions.

47. The method of claim 23 wherein there is a communication link between the relay and the captioned device, the step of receiving voice communications including receiving the voice communications via the communication link, the step of transmitting captions including transmitting captions via the communication link.

48. The method of claim 47 wherein the communication link includes an internet connection.

49. The method of claim 13 wherein the AU's device is also linked to at least one additional user's device during a conversation, the method further including transmitting the AU's voice signal from the captioned device to the additional user's device, obtaining an audio signal including an additional user's voice signal generated by the additional user's device at the captioned device, broadcasting the additional user's voice signal via the speaker, transmitting the additional user's voice signal to the relay, receiving captions at the captioned device from the relay corresponding to the additional user's voice signal, and presenting the captions corresponding to the additional user's voice signal on the display screen.

50. The method of claim 49 wherein the AU's device is located at a household and wherein the additional user's device is an extension telephone at the household.

* * * * *